(12) United States Patent
Hosokawa et al.

(10) Patent No.: US 10,176,543 B2
(45) Date of Patent: Jan. 8, 2019

(54) IMAGE PROCESSING BASED ON IMAGING CONDITION TO OBTAIN COLOR IMAGE

(71) Applicant: SONY CORPORATION, Tokyo (JP)

(72) Inventors: Kenichiro Hosokawa, Kanagawa (JP); Takuro Kawai, Tokyo (JP); Masatoshi Yokokawa, Kanagawa (JP); Toshiyuki Sasaki, Tokyo (JP); Kazunori Kamio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/539,815

(22) PCT Filed: Nov. 2, 2015

(86) PCT No.: PCT/JP2015/080965
§ 371 (c)(1),
(2) Date: Jun. 26, 2017

(87) PCT Pub. No.: WO2016/113983
PCT Pub. Date: Jul. 21, 2016

(65) Prior Publication Data
US 2017/0372444 A1 Dec. 28, 2017

(30) Foreign Application Priority Data
Jan. 13, 2015 (JP) ................. 2015-004121

(51) Int. Cl.
*H04N 9/07* (2006.01)
*G06T 1/00* (2006.01)
(Continued)

(52) U.S. Cl.
CPC ............ *G06T 1/00* (2013.01); *G06K 9/00369* (2013.01); *G06T 7/11* (2017.01); *G06T 7/50* (2017.01);
(Continued)

(58) Field of Classification Search
CPC ......... G06K 9/00369; G06T 1/00; G06T 7/11; G06T 7/50; H04N 5/232; H04N 5/33; H04N 7/18; H04N 9/07; H04N 1/60
See application file for complete search history.

(56) References Cited

U.S. PATENT DOCUMENTS 9,451,183 B2 * 9/2016 Hogasten ............. H04N 5/2257
2002/0051578 A1 5/2002 Imagawa et al.
(Continued)

FOREIGN PATENT DOCUMENTS

CN 2842571 Y 11/2006
CN 101119448 A 2/2008
(Continued)

OTHER PUBLICATIONS

International Search Report and Written Opinion of PCT Application No. PCT/JP2015/080965, dated Dec. 15, 2015, 02 pages of English Translation and 07 pages of ISRWO.
(Continued)

*Primary Examiner* — Amy Hsu
(74) *Attorney, Agent, or Firm* — Chip Law Group

(57) ABSTRACT

[Object] To generate a color image with further improved image quality. [Solution] Provided is an image processing device including: an image acquisition unit that acquires a far-infrared image, a near-infrared image, and a visible light image in which a common imaged object is captured; and a generation unit that generates a color image by filtering filter taps including pixels of the far-infrared image, the near-infrared image, and the visible light image.

14 Claims, 24 Drawing Sheets

(51) Int. Cl.
    *H04N 1/60*        (2006.01)
    *H04N 5/225*      (2006.01)
    *H04N 5/232*      (2006.01)
    *H04N 7/18*        (2006.01)
    *G06T 7/50*        (2017.01)
    *G06T 7/11*        (2017.01)
    *G06K 9/00*       (2006.01)
    *H04N 5/33*       (2006.01)

(52) U.S. Cl.
    CPC ............... *H04N 1/60* (2013.01); *H04N 5/225* (2013.01); *H04N 5/232* (2013.01); *H04N 5/33* (2013.01); *H04N 7/18* (2013.01); *H04N 9/07* (2013.01)

(56) References Cited

U.S. PATENT DOCUMENTS

| | | | | |
|---|---|---|---|---|
| 2006/0268110 | A1* | 11/2006 | Koike | G06T 5/50 348/159 |
| 2009/0018711 | A1 | 1/2009 | Ueda et al. | |
| 2010/0085453 | A1* | 4/2010 | Oh | H04N 9/045 348/294 |
| 2010/0283866 | A1 | 11/2010 | Numata | |
| 2010/0315539 | A1* | 12/2010 | Azuma | H04N 5/23232 348/265 |
| 2012/0057759 | A1* | 3/2012 | Yonaha | G06T 7/73 382/107 |
| 2013/0058591 | A1* | 3/2013 | Nishiyama | H04N 5/217 382/264 |
| 2014/0340515 | A1* | 11/2014 | Tanaka | G06T 5/003 348/143 |

FOREIGN PATENT DOCUMENTS

| | | |
|---|---|---|
| CN | 101342892 A | 1/2009 |
| CN | 101578885 A | 11/2009 |
| CN | 102647449 A | 8/2012 |
| CN | 103259976 A | 8/2013 |
| EP | 1202214 A2 | 5/2002 |
| EP | 2015276 A2 | 1/2009 |
| JP | 2000-115759 A | 4/2000 |
| JP | 2002-203240 A | 7/2002 |
| JP | 2007-158820 A | 6/2007 |
| JP | 2008-289001 A | 11/2008 |
| JP | 2009-020577 A | 1/2009 |
| JP | 2011-055133 A | 3/2011 |
| JP | 2011-55133 A | 3/2011 |
| JP | 2012-94946 A | 5/2012 |
| JP | 2012-094946 A | 5/2012 |
| JP | 5110356 B2 | 12/2012 |
| JP | 2013-65280 A | 4/2013 |
| JP | 2013-065280 A | 4/2013 |
| JP | 2014-197727 A | 10/2014 |

OTHER PUBLICATIONS

Yamauchi, et al., "Human Detection Based on Statistical Learning from Image", The Transactions of the Institute of Electronics, Information and Communication Engineers, Sep. 1, 2013, vol. J96-D, No. 9, 2017 to 2040 pages, ISSN 1880-4535, particularly, 2018 to 2023 pages.

Yamauchi, et al., "Human Detection Based on Statistical Learning from Image", vol. J96-D, No. 9, 2013, pp. 2017-2040.

Extended European Search Report of EP Application No. 15877935.5, dated May 14, 2018, 06 pages of EESR.

Office Action for CN Patent Application No. 201580072616.2, dated Sep. 12, 2018, 10 pages of Office Action and 12 pages of English Translation.

\* cited by examiner

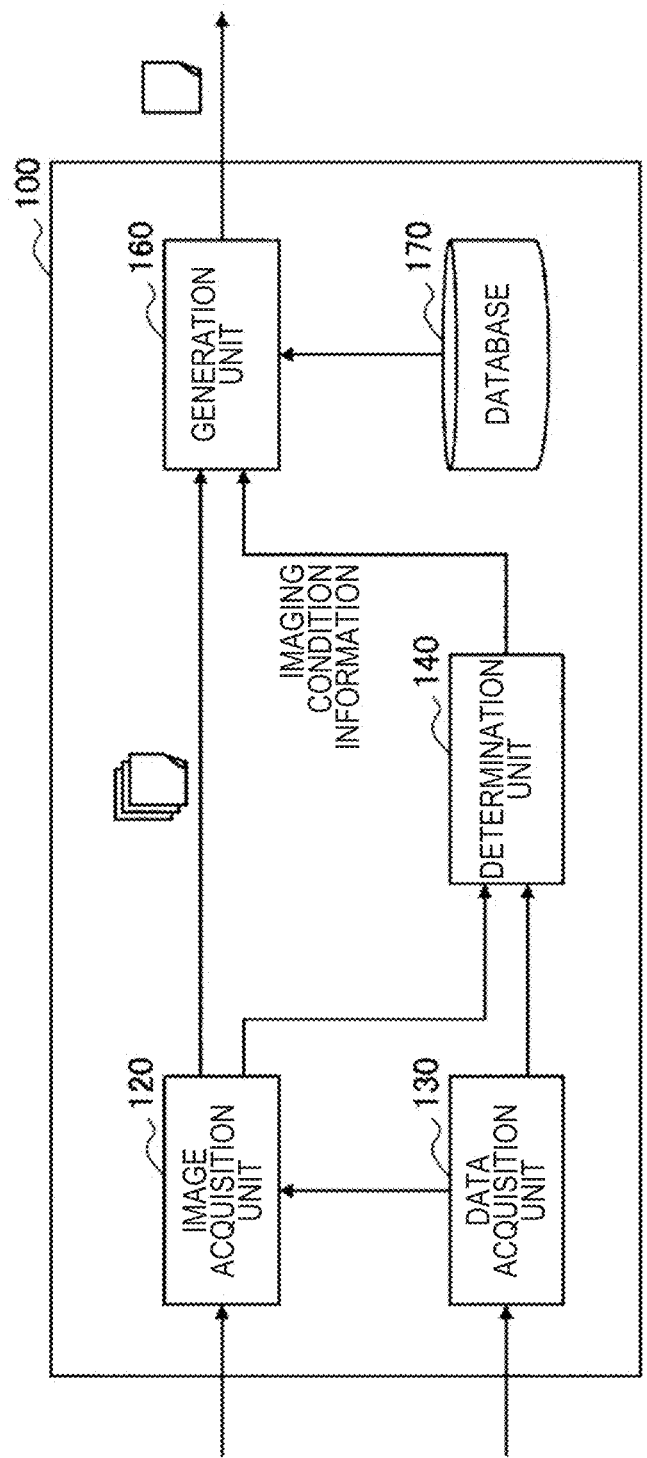

FILTER CONFIGURATION (CONDITION C1)

CONDITION C2
× CLEAR
× NIGHT

FILTER CONFIGURATION (CONDITION C2)

FILTER CONFIGURATION (CONDITION C3)

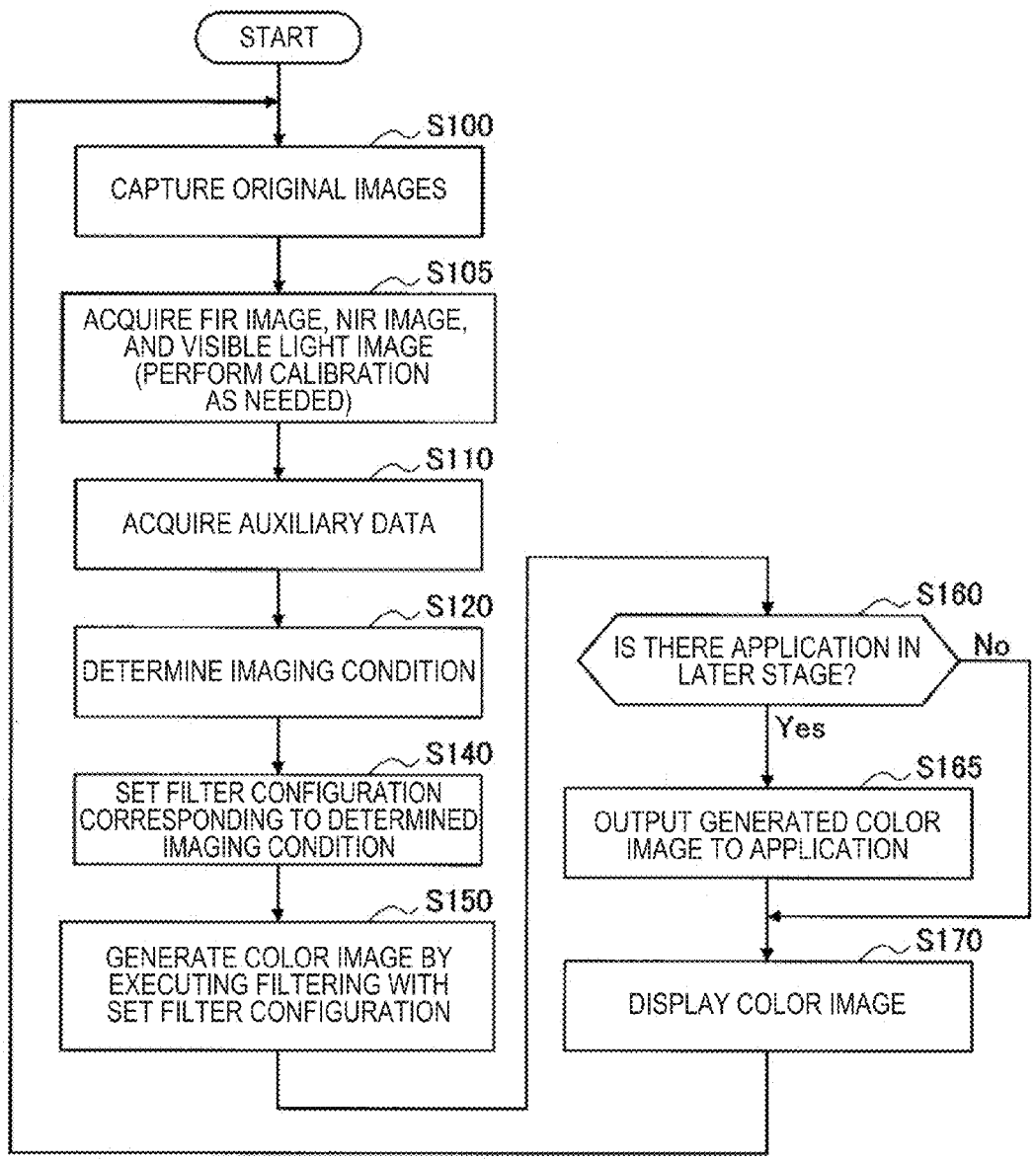

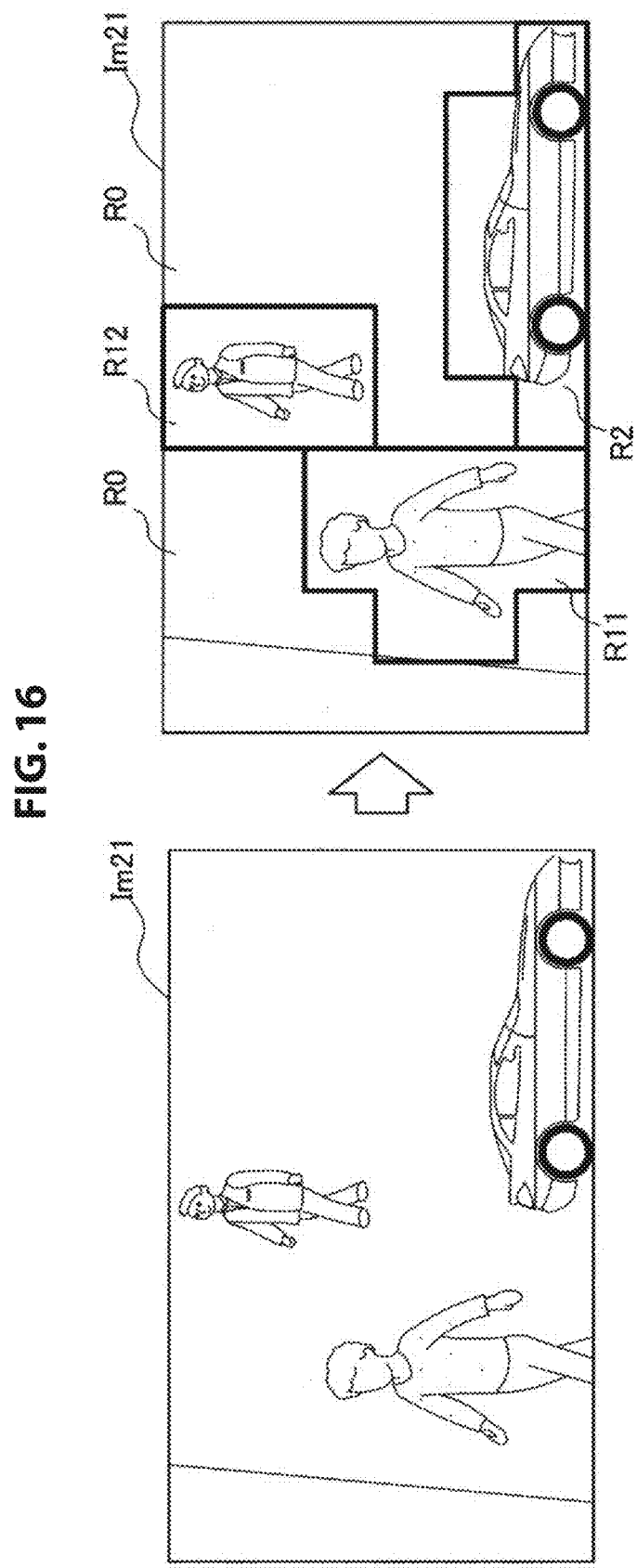

IMAGE PROCESSING BASED ON IMAGING CONDITION TO OBTAIN COLOR IMAGE

CROSS REFERENCE TO RELATED APPLICATIONS

This application is a U.S. National Phase of International Patent Application No. PCT/JP2015/080965 filed on Nov. 2, 2015, which claims priority benefit of Japanese Patent Application No. JP 2015-004121 filed in the Japan Patent Office on Jan. 13, 2015. Each of the above-referenced applications is hereby incorporated herein by reference in its entirety.

TECHNICAL FIELD

The present disclosure relates to an image processing device, an image processing method, a program, and a system.

BACKGROUND ART

In the related art, images captured by infrared cameras have been used for drive assist and other purposes (see Patent Literature 1, for example). For example, it is possible to provide images with visibility that is high to some extent to a user even under poor conditions, such as at night or in bad weather, by capturing near-infrared images instead of visible light images (see Patent Literature 2, for example). Although infrared images are typically grayscale images with no color, provision of color in infrared images by using color information from visible light images has also been proposed (see Patent Literature 3, for example).

CITATION LIST

Patent Literature

Patent Literature 1: JP 2000-115759A
Patent Literature 2: JP 2007-158820A
Patent Literature 3: JP 2014-197727A

DISCLOSURE OF INVENTION

Technical Problem

In general, it is advantageous to provide a color image that has satisfactorily high image quality to the maximum extent for the purpose of allowing a user or an image processing application to recognize an imaged object (for example, a human body or an object) that appears in the image. However, it is difficult to state that an existing technology for providing color in an infrared image has achieved sufficient image quality appropriate for such a purpose.

Thus, an object of the technology according to the present disclosure is to realize a mechanism capable of generating a color image with further improved image quality.

Solution to Problem

According to the present disclosure, there is provided an image processing device including: an image acquisition unit that acquires a far-infrared image, a near-infrared image, and a visible light image in which a common imaged object is captured; and a generation unit that generates a color image by filtering filter taps including pixels of the far-infrared image, the near-infrared image, and the visible light image.

Further, according to the present disclosure, there is provided an image processing method including: acquiring a far-infrared image, a near-infrared image, and a visible light image in which a common imaged object is captured; and generating a color image by filtering filter taps including pixels of the far-infrared image, the near-infrared image, and the visible light image.

Further, according to the present disclosure, there is provided a program causing a computer that controls an image processing device to function as: an image acquisition unit that acquires a far-infrared image, a near-infrared image, and a visible light image in which a common imaged object is captured; and a generation unit that generates a color image by filtering filter taps including pixels of the far-infrared image, the near-infrared image, and the visible light image.

Further, according to the present disclosure, there is provided an image processing system including: a camera module that captures an imaged object in a far-infrared region, a near-infrared region, and a visible light region and outputs a corresponding far-infrared image, near-infrared image, and visible light image; and an image processing module that generates a color image by filtering filter taps including pixels of the far-infrared image, the near-infrared image, and the visible light image.

Advantageous Effects of Invention

According to the technology of the present disclosure, it is possible to generate a color image with further improved image quality.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a block diagram illustrating an example of a configuration of theoretical functions of the image processing device according to the first embodiment.

FIG. 13 is a flowchart illustrating an example of a flow of color image generation processing according to the first embodiment.

FIG. 16 is an explanatory diagram illustrating an example of region recognition processing according to the second embodiment.

MODE(S) FOR CARRYING OUT THE INVENTION

Figure 1:
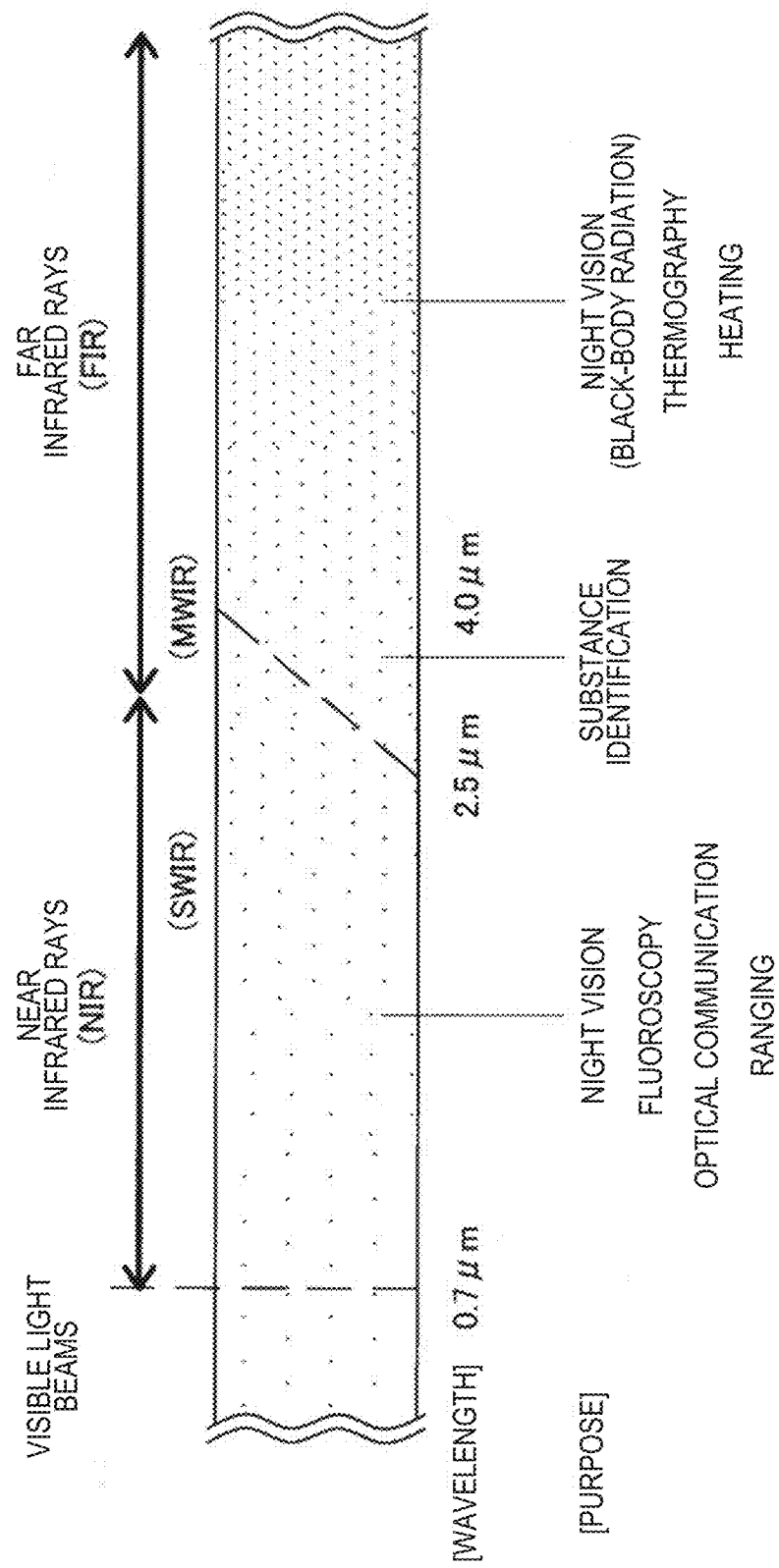
FIG. 1 is an explanatory diagram illustrating various purposes of infrared images that depend on wavelengths.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Basic principles
1-1. Various purposes of infrared rays
1-2. Characteristics of each image
2. First embodiment
2-1. Hardware configuration
2-2. Functional configuration
2-3. Flow of processing
3. Second embodiment
3-1. Functional configuration
3-2. Flow of processing
4. Application examples
5. Conclusion

1. BASIC PRINCIPLES

[1-1. Various Purposes of Infrared Rays]

FIG. 1 is an explanatory diagram illustrating various purposes of infrared images depending on wavelengths. The horizontal direction in FIG. 1 corresponds to a wavelength of an infrared ray, and the wavelength increases from the left side to the right side. A wavelength region that is adjacent to a visible light region is a near-infrared (NIR) region, and infrared rays that belong to the NIR region are referred to as near-infrared rays. Although the upper limit wavelength of the NIR region differs depending on definitions, the upper limit wavelength is assumed to be between 2.5 μm and 4.0 μm in many cases. A portion with a relatively long wavelength in the NIR region is also referred to as a short-wavelength infrared (SWIR) region. Near-infrared rays can be used for night vision, fluoroscopy, optical communication, and ranging. A camera that captures NIR images typically emits infrared rays to the vicinity of an imaging target first and captures reflected light thereof. A wavelength region that is adjacent to the NIR region on the long wavelength side is a far-infrared (FIR) region, and infrared rays that belong to the FIR region are referred to as far-infrared rays. Far-infrared rays can be used for night vision, thermography, and heating. Infrared rays that are emitted by black-body radiation from an object correspond to far-infrared rays. Therefore, a night vision device that uses far-infrared rays can generate FIR images by capturing black-body radiation from an object without emitting infrared rays. A portion with a relatively short wavelength in the FIR region is also referred to as a middle wavelength infrared (MWIR) region. Since absorption spectra unique to substances appear in a wavelength range of middle wavelength infrared rays, middle wavelength infrared rays can be used for identifying substances.

[1-2. Characteristics of Each Image]

Visible light images have already been used widely for the purpose of allowing users or some applications to recognize imaged objects which are captured in the images because colors are inherently expressed in visible light images. Visible light images have a disadvantage that visibility is significantly degraded in a situation in which environmental light is insufficient (such as at night or in bad weather). Also, creating environmental light by emitting visible light (so-called flash) is avoided in many scenes since the visible light is sensed by human vision. Infrared images can compensate for such a disadvantage of visual light images. For example, the technology proposed in Patent Literature 2 provides NIR images with higher visibility to drivers instead of visible light images under poor conditions such as at night or in bad weather. Infrared images are typically grayscale images with no color, and Patent Literature 3 proposes provision of color in infrared images by using color information from visible light images. In general, it is desirable for color images provided to users or applications to have satisfactory quality to the maximum extent.

Figure 2:
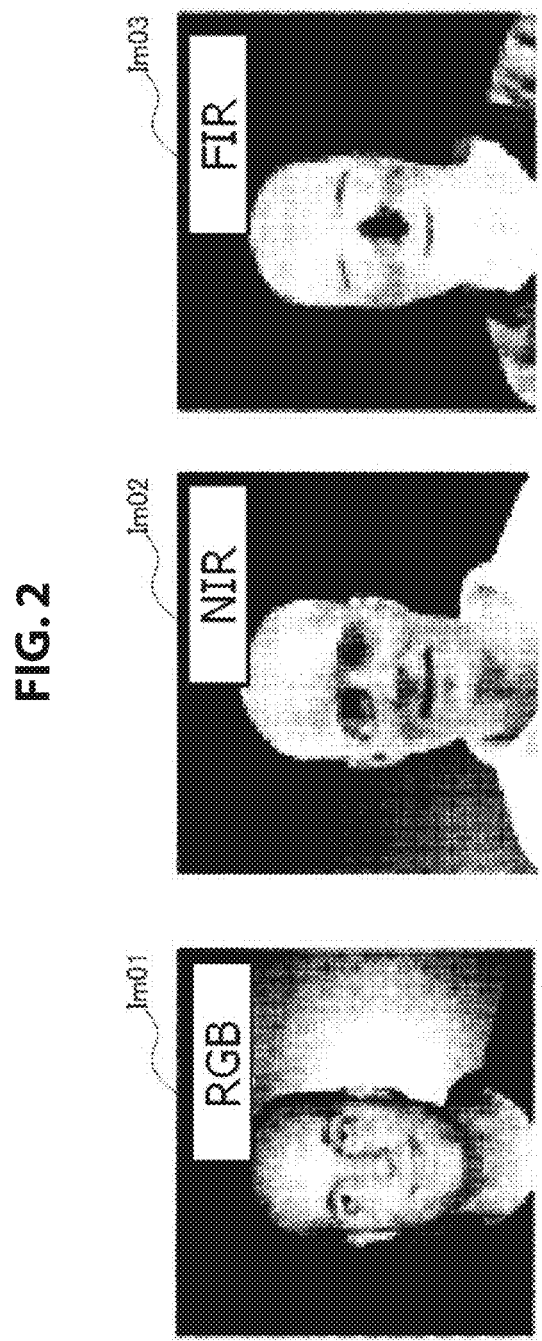
FIG. 2 is an explanatory diagram illustrating examples of a visible light image, a near-infrared image, and a far-infrared image.

FIG. 2 is an explanatory diagram illustrating examples of a visible light image, a near-infrared (NIR) image, and a far-infrared (FIR) image. A visible light image Im01 is illustrated on the left side, an NIR image Im02 is illustrated at the center, and an FIR image Im03 is illustrated on the right side in FIG. 2. The same person is captured in these images. The visible light image Im01 most satisfactorily expresses the face of the person while a boundary between the imaged object and the background is unclear at a peripheral edge portion of the imaged object that does not receive sufficient environmental light. In contrast, the clothing that most strongly reflects near-infrared rays rather than the human face is captured with the highest brightness in the NIR image Im02 while the boundary between the imaged object and the background is clear. This indicates the possibility of an imaged object being buried in a background in a similar situation in which an object that strongly reflects the near-infrared rays is present in a background. The boundary between the imaged object and the background is also clear in the FIR image. Since the face is captured with higher brightness than the clothing in the FIR image while details of the face of the human are not expressed, it is possible to understand that the FIR image is more suitable for detection of a living body than the visible light image and the NIR image.

Color information related to colors of an imaged object is typically included only in a visible light image. However, it is necessary to consider viewpoints regarding which region in an image is to be expressed with more clarity and which region requires color details in order to determine a color image to be finally output. Information from such viewpoints is included in each of the FIR image and the NIR image rather than the visible image. Thus, some embodiments in which a color image with more improved image quality is generated in consideration of the FIR image and the NIR image in addition to the visible light image will be described in the specification.

2. FIRST EMBODIMENT

In this section, an image processing device 100 which is an in-vehicle apparatus will be described as an example. Although the image processing device 100 has a configuration that is partially customized for installation in a vehicle, a purpose of the technology according to the present disclosure is not limited to such an example. The technology according to the present disclosure can be applied, for example, to generation of color images by arbitrary types of apparatuses such as security apparatuses including monitoring cameras, medical/diagnosis apparatuses, inspection apparatuses, and information apparatuses including smartphones and tablet personal computers (PCs).

[2-1. Hardware Configuration]

Figure 3:
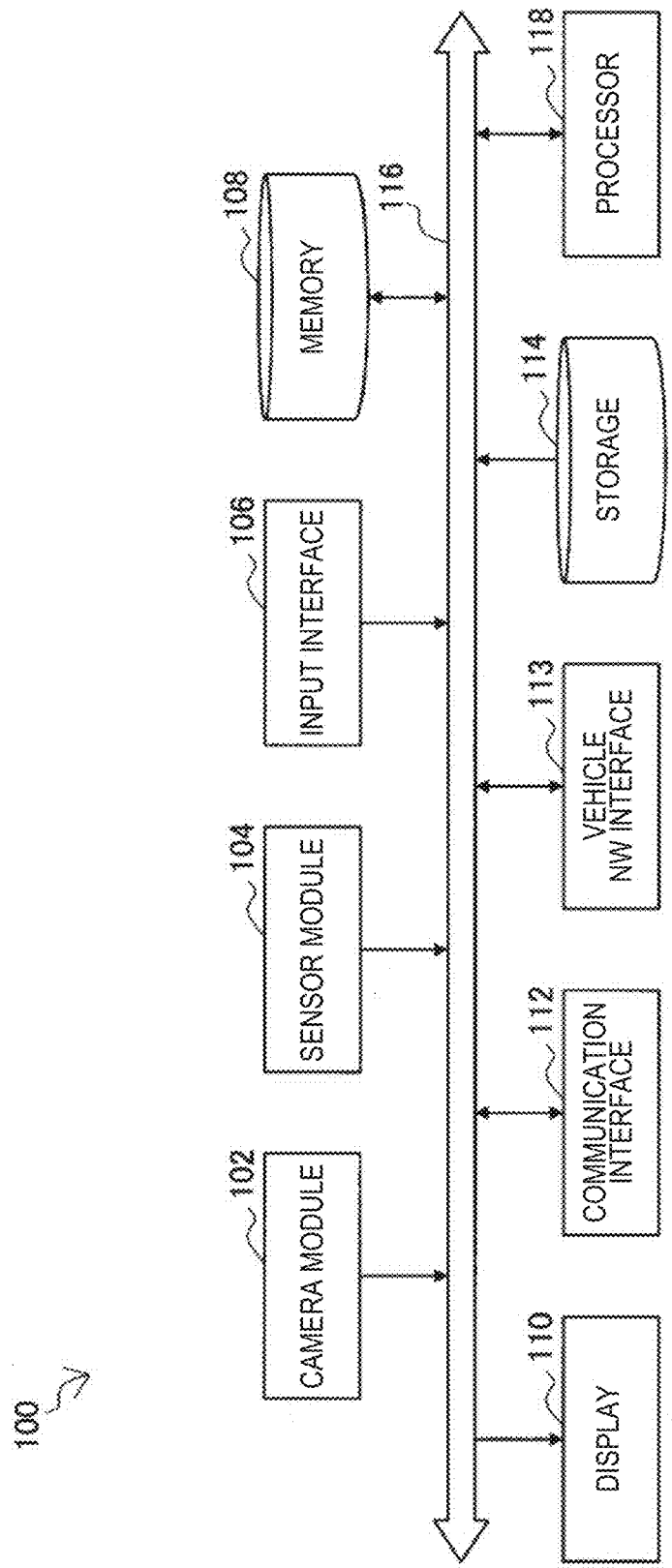
FIG. 3 is a block diagram illustrating an example of a hardware configuration of an image processing device according to a first embodiment.

FIG. 3 is a block diagram illustrating an example of a hardware configuration of the image processing device 100 according to a first embodiment. Referring to FIG. 3, the image processing device 100 includes a camera module 102, a sensor module 104, an input interface 106, a memory 108, a display 110, a communication interface 112, a vehicle network (NW) interface 113, a storage 114, a bus 116, and a processor 118.

(1) Camera Module

The camera module 102 is a module that captures an imaged object in the FIR region, the NIR region, and the visible light region. The camera module 102 typically includes an array of imaging elements that sense far-infrared rays with wavelengths that belong to the FIR region, an array of imaging elements that sense near-infrared rays with wavelengths that belong to the NIR region, and an array of imaging elements that sense visible light. These arrays may be arranged on the same substrate or may be arranged on different substrates. The camera module 102 can further have a light emitting element that emits near-infrared rays. The camera module 102 captures FIR images, NIR images, and visible light images periodically or in response to a trigger such as a user input, for example. These images may be parts of a series of frames that form a moving image.

(2) Sensor Module

The sensor module 104 is a module that has a group of sensors that can include a position measurement sensor, an acceleration sensor, a depth sensor, an illuminance sensor, a temperature sensor, and a humidity sensor. The position measurement sensor measures a current position of the image processing device 100 on the basis of a GPS signal from a Global Positioning System (GPS) satellite or a wireless signal from a wireless access point. The acceleration sensor measures a three-axis speed applied to the image processing device 100. The depth sensor measures a distance (that is, a depth) to an imaged object that is present in an angle of view of the camera module 102. The illuminance sensor measures illuminance in an environment in which the image processing device 100 is placed. The temperature sensor and the humidity sensor respectively measure a temperature and humidity in the environment. Sensor data generated by the sensor module 104 can be utilized for the purpose of calibration of images and determination of an imaging condition, which will be described later.

(3) Input Interface

The input interface 106 is used by a user to operate the image processing device 100 or input information to the image processing device 100. For example, the input interface 106 may include an input device such as a touch sensor, a keypad, a button, or a switch. The input interface 106 may include a microphone for sound input and sound recognition module. The input interface 106 may include a remote control module that receives commands selected by the user from a remote device.

(4) Memory

The memory 108 is a storage medium that can include a random access memory (RAM) and a read only memory (ROM). The memory 108 is coupled to the processor 118 and stores a program and data for processing executed by the processor 118.

(5) Display

The display 110 is a display module that has a screen for displaying images. For example, the display 110 may be a liquid crystal display (LCD), an organic light-emitting diode (OLED), or a cathode ray tube (CRT).

(6) Communication Interface

The communication interface 112 is a module that relays communication between the image processing device 100 and other devices. The communication interface 112 establishes communication connection in accordance with an arbitrary wireless communication protocol or a wired communication protocol.

(7) Vehicle NW Interface

The vehicle NW interface 113 is a module that relays communication between the vehicle in which the image processing device 100 is installed and a vehicle network. The vehicle NW interface 113 is connected to the vehicle network via a terminal, which is not illustrated in the drawing, for example, and acquires data generated on the vehicle side, such as vehicle speed data and steering angle data.

(8) Storage

The storage 114 is a storage device that accumulates image data and stores a database utilized in image processing executed by the image processing device 100. The storage 114 embeds a storage medium such as a semiconductor memory or hard disk therein. The program and the data described in the specification may be acquired from a data source (a data server, a network storage, or an external memory, for example) outside the image processing device 100.

(9) Bus

The bus 116 connects the camera module 102, the sensor module 104, the input interface 106, the memory 108, the display 110, the communication interface 112, the vehicle NW interface 113, the storage 114, and the processor 118.

(10) Processor

The processor 118 is a processing module such as a central processing unit (CPU) or a digital signal processor (DSP). The processor 118 causes functions of generating a color image with improved image quality, which will be described later, to be operated by executing a program stored in the memory 108 or another storage medium.

Figure 4:
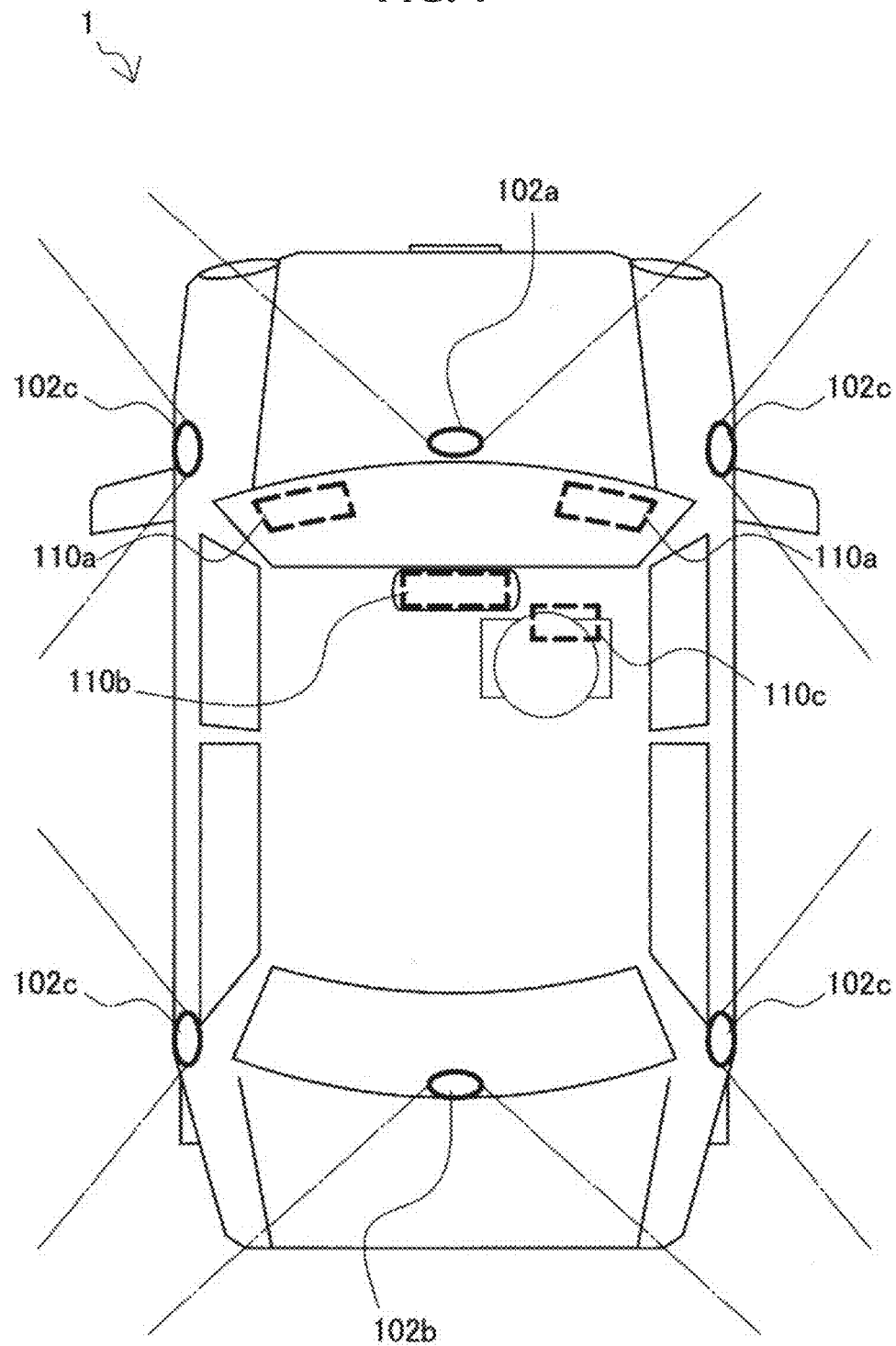
FIG. 4 is an explanatory diagram illustrating some examples of arrangement of a camera and a display in a vehicle.

FIG. 4 is an explanatory diagram illustrating some examples of arrangement of a camera and a display in a vehicle. FIG. 4 illustrates a simplified planar view of a vehicle 1 in one example by a solid line. For example, a camera 102a is arranged at the center of a front portion of a body of the vehicle 1 and is made to face the front side of the vehicle 1. A camera 102b is arranged at the center of a rear portion of the body and is made to face the rear side of the vehicle 1. A plurality of cameras 102c are arranged on both sides of the vehicle 1 and are made to face side directions of the vehicle 1. The camera module 102 illustrated in FIG. 3 may include any combination of these cameras 102a, 102b, and 102c and other cameras in a different arrangement.

A display 110a is arranged on a dashboard or in the vicinity thereof, and is typically shared by a navigation apparatus. A display 110b is arranged in a room mirror and displays an image of the rear side of the body that is captured by the camera 102b, for example. A display 110c is a wearable device (for example, a head-mount display) that a driver wears. The display 110 illustrated in FIG. 3 may have any combination of these displays 110a, 110b, and 110c and other displays in a different arrangement. Also, the camera module 102, the display 110, and some other components illustrated in FIG. 3 may be outside the image processing device 100 and may be connected to the image processing device 100 with signal lines.

[2-2. Functional Configuration]

FIG. 5 is a block diagram illustrating an example of a configuration of theoretical functions that are realized by components of the image processing device 100 illustrated in FIG. 3 in cooperation with each other. Referring to FIG. 5, the image processing device 100 includes an image acquisition unit 120, a data acquisition unit 130, a determination unit 140, a generation unit 160, and a database 170.

(1) Image Acquisition Unit

The image acquisition unit 120 acquires a far-infrared (FIR) image, a near-infrared (NIR) image, and a visible light image in which a common imaged object is captured from the camera module 102 and outputs the acquired images to the determination unit 140 and the generation unit 160. The images acquired by the image acquisition unit 120 may be images after primitive processing such as signal amplification, demosaicing, and noise removal. The image acquisition unit 120 performs preliminary processing such as image calibration, separation of wavelength components, and merging of points of view for generating a color image as needed. In this specification, an image with improved image quality obtained in consideration of the FIR image and the NIR image will be referred to as a color image, and an image captured by the visible light camera before the improvement of image quality will be referred to as a visible light image (the visible light image also has color).

FIGS. 6A, 6B, 6C and 6D respectively illustrate examples of processing related to acquisition of images along with corresponding configuration examples of the camera module 102. In the first example illustrated in FIG. 6A, the camera module 102 includes an image sensor 102a-1 that captures a visible light image, an image sensor 102a that captures an NIR image, and an image sensor 102a-3 that captures an FIR image. Since these image sensors are provided on mutually different substrates, the visible light image, the NIR image, and the FIR image that are primitively captured contain deviations in angles of view. Thus, the image acquisition unit 120 executes calibration 121 for compensating for the deviations in the angles of view between the images. The calibration 121 may include processing that solves not only the deviations in the angles of view but also differences in spatial resolutions and differences and aberrations in time resolution. The differences in the spatial resolutions can be solved by interpolating pixel values in an image with a lower resolution or by thinning pixels in an image with a higher resolution. The differences in the time resolutions (that is, frame rates) can be solved by interpolating frames or by thinning frames. The aberrations (for example, color aberrations and single-color aberrations) may be reduced by a pixel operation performed by the image acquisition unit 120 or may be corrected by an optical system.

Figure 6A:
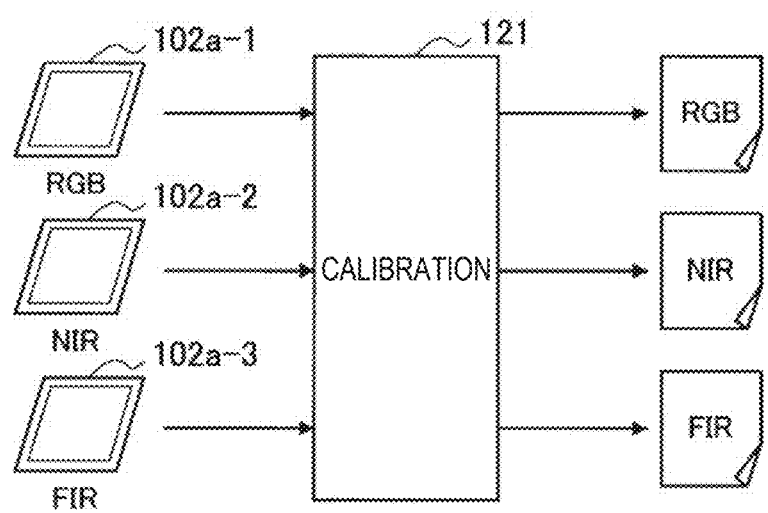
FIG. 6A is an explanatory diagram illustrating a first example of processing related to acquisition of an image.
Figure 6B:
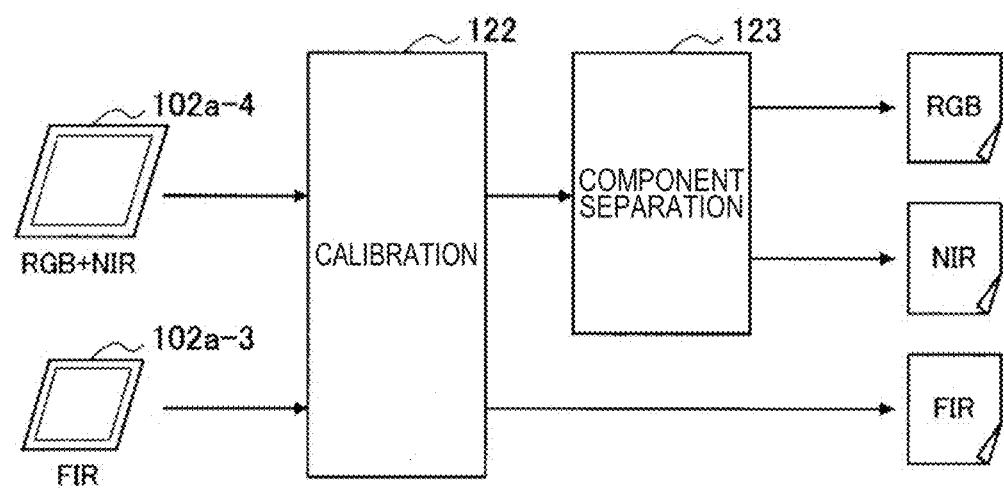
FIG. 6B is an explanatory diagram illustrating a second example of processing related to acquisition of an image.

In the second example illustrated in FIG. 6B, the camera module 102 includes a single-panel image sensor 102a-4 that captures a visible light image and an NIR image and an image sensor 102a-3 that captures an FIR image. In the second example, there is no deviation in angles of view between the visible light image and the NIR image, and the calibration 122 can thus include compensation for the deviation in the angle of view related to the FIR image and other aforementioned processing. Furthermore, there are cases in which color mixing (for example, red (R) components affect NIR pixel values) caused by a correlation between the visible light region and the NIR region occurs in an image captured by the single-panel image sensor 102a-4. Thus, the image acquisition unit 120 can execute component separation processing 123 (for example, a filter operation for separating components) for separating wavelength components mixed between the visible light image and the NIR image.

Figure 6C:
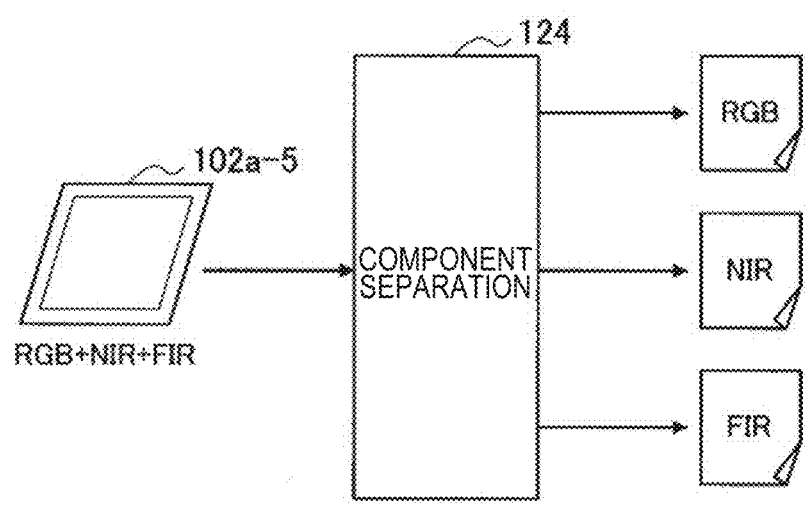
FIG. 6C is an explanatory diagram illustrating a third example of processing related to acquisition of an image.

In the third example illustrated in FIG. 6C, the camera module 102 includes a single-panel image sensor 102a-5 that captures a visible light image, an NIR image, and an FIR image. In the third example, there are no deviations in angles of view of the three images. However, since there is a possibility of color mixing occurring in the captured images due to a correlation among wavelengths in the visible light region, the NIR region, and the FIR region, the image acquisition unit 120 can execute component separation processing 124 for separating the respective wavelength components.

Figure 6D:
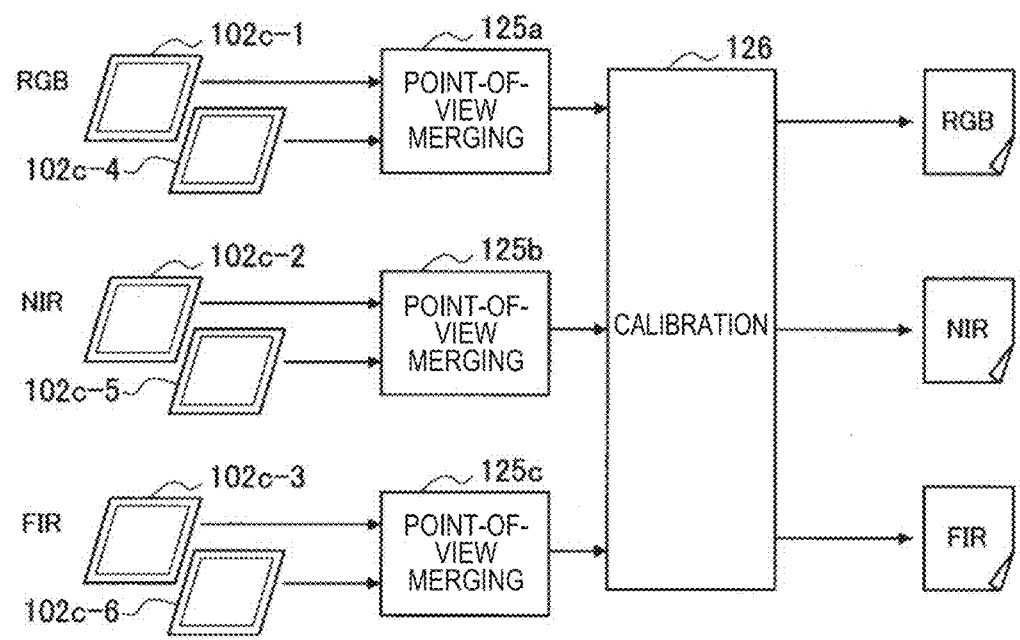
FIG. 6D is an explanatory diagram illustrating a fourth example of processing related to acquisition of an image.

In the fourth example illustrated in FIG. 6D, the camera module 102 includes image sensors 102c-1 and 102c-4 that capture visible light images at adjacent angles of view (which can partially overlap), image sensors 102c-2 and 102c-5 that capture NIR images at adjacent angles of view (which can partially overlap), and image sensors 102c-3 and 102c-6 that can capture FIR images at adjacent angles of view (which can partially overlap). The image acquisition unit 120 can generate a single visible light image with a larger size by executing point-of-view merging processing 125a for combining the visible light images from the image sensors 102c-1 and 102c-4 at the boundary of the angles of view, for example. Similarly, the image acquisition unit 120 can generate a single NIR image through point-of-view merging processing 125b and can generate a single FIR image through point-of-view merging processing 125c. The image acquisition unit 120 also executes calibration 126 on the visible light image, the NIR image, and the FIR image to solve deviations in the angles of view, differences in spatial resolutions, differences in time resolutions, and aberrations.

(2) Data Acquisition Unit

The data acquisition unit 130 acquires various kinds of data other than images that are utilized for generating a color image in the image processing device 100. For example, the data acquisition unit 130 may acquire position measurement data indicating a geographical position of the image processing device 100 from the sensor module 104 and may acquire weather data from an external data server via the communication interface 112. The position measurement data and the weather data are utilized for determining weather of a current location when the determination unit 140 determines an imaging condition as will be described later. The weather data may be input by the user via the input interface 106. The data acquisition unit 130 may acquire illuminance data, temperature data, and humidity data from the sensor module 104. The data can also be utilized for determining imaging conditions by the determination unit 140.

Also, the data acquisition unit 130 may acquire driving data that includes vehicle speed data and steering angle data from the vehicle network via the vehicle NW interface 113. The driving data can be utilized for motion prediction and motion blur correction when the image acquisition unit 120 performs frame rate conversion, for example.

(3) Determination Unit

The determination unit 140 determines an imaging condition when the FIR image, the NIR image, and the visible light image are captured. In the embodiment, the imaging condition includes one or more of a time slot, weather, and environmental illuminance. For example, the determination unit 140 determines a time slot to which the current time belongs to. The time slot may be classified in any manner, such as into two types including "day" and "night" or four types including "morning," "daytime," "evening," and "night." The determination unit 140 can determine the weather of the current location indicated by the position measurement data with reference to weather data that is acquired from an external server or is input by the user. The weather may be defined in any manner. In one example, the determination unit 140 can classify the weather at that time into any of "clear," "cloudy," "rainy," "snowy," and "foggy." The determination unit 140 may estimate the weather of the current location from temperature data and humidity data instead of determining the weather from the weather data. Also, the determination unit 140 can determine environmental illuminance on the basis of illuminance data from the sensor module 104. The determination unit 140 outputs imaging condition information indicating results of such determination to the generation unit 160.

(4) Generation Unit

The generation unit 160 generates a color image by filtering filter taps including pixels of the FIR image, the NIR image, and the visible light image. The pixels selected from the FIR image contribute to identification of the imaged object under a situation of poor environmental light, in particular, emphasis of color in a living body region. Although the pixels selected from the NIR image also contribute to the identification of the imaged object under the situation of poor environmental light, the pixels particularly contribute to clarification of details of the imaged object due to an action of emitting the near-infrared rays. Infrared rays that have higher straightness than visible light contribute to generation of an image with high visibility under rainy or foggy conditions. The pixels selected from the visible light image directly provide color information in the color image.

In the embodiment, the generation unit 160 executes filtering for generating a color image with a filter configuration that differs depending on the image conditions determined by the determination unit 140. Hereinafter, examples of filter configurations corresponding to some examples of imaging conditions will be described with reference to FIGS. 7 to 12.

Figure 7:
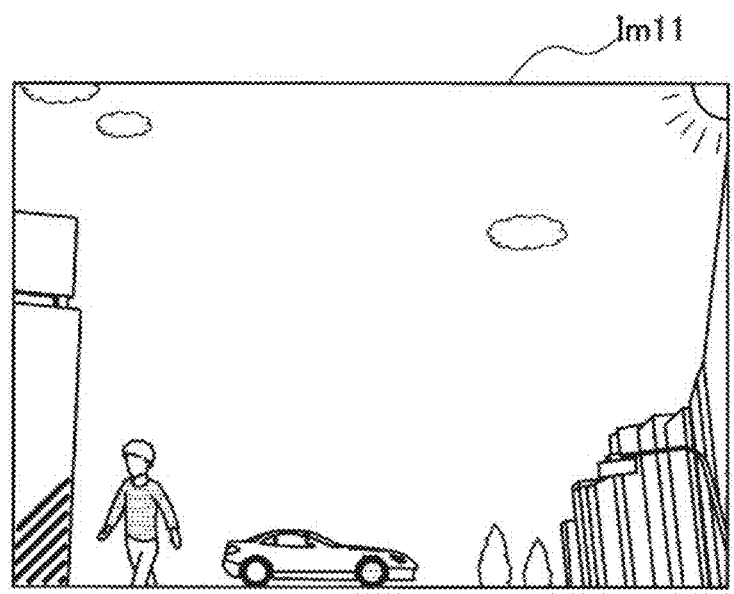
FIG. 7 is an explanatory diagram illustrating a first example of an imaging condition.
Figure 8:
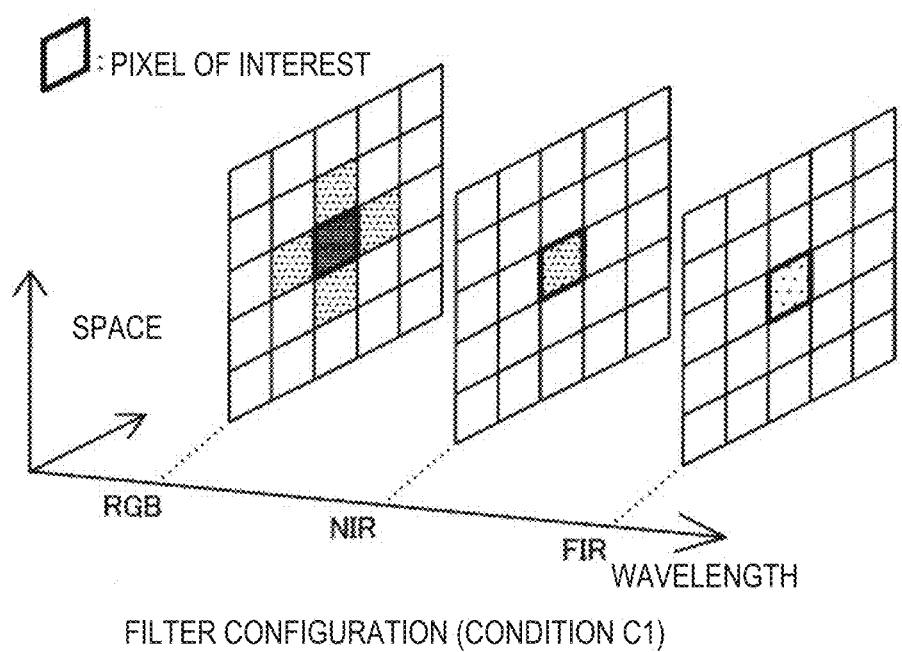
FIG. 8 is an explanatory diagram illustrating an example of a filter configuration corresponding to the first example of the imaging condition.

FIG. 7 is an explanatory diagram illustrating a first example of an imaging condition. Referring to FIG. 7, an illustrative visible light image Im11 is illustrated. The weather when the visible light image Im11 is captured is "clear," and the time slot is "daytime." That is, an imaging condition C1 associated with the visible light image Im11 represents a combination of "clear" and "daytime." FIG. 8 is an explanatory diagram illustrating an example of a filter configuration corresponding to the imaging condition C1. Referring to FIG. 8, an axis in a one-dimensional wavelength direction and axes in two-dimensional spatial directions are illustrated, and further, a visible light (RGB) image, an NIR image, and an FIR image are partially illustrated at corresponding wavelength positions. Although the visible light image actually has three wavelength components, the visible light image is integrated at one wavelength position herein for simplification. The visible light image is not limited to the example illustrated in the drawing and may be expressed by a color system other than RGB. The grids of the respective images in FIG. 8 indicate arrays of pixels, and each rectangle of a thick line represents a position of a pixel of interest. The density of the hatching applied to each pixel expresses a filter coefficient (that is, a weight in a filter operation) assigned to the pixel. The imaging condition C1 represents the combination of "clear" and "daytime" as described above, and therefore more pixels are selected from the visible light image, and larger filter coefficients are provided for the pixels of the visible light image.

Figure 9:
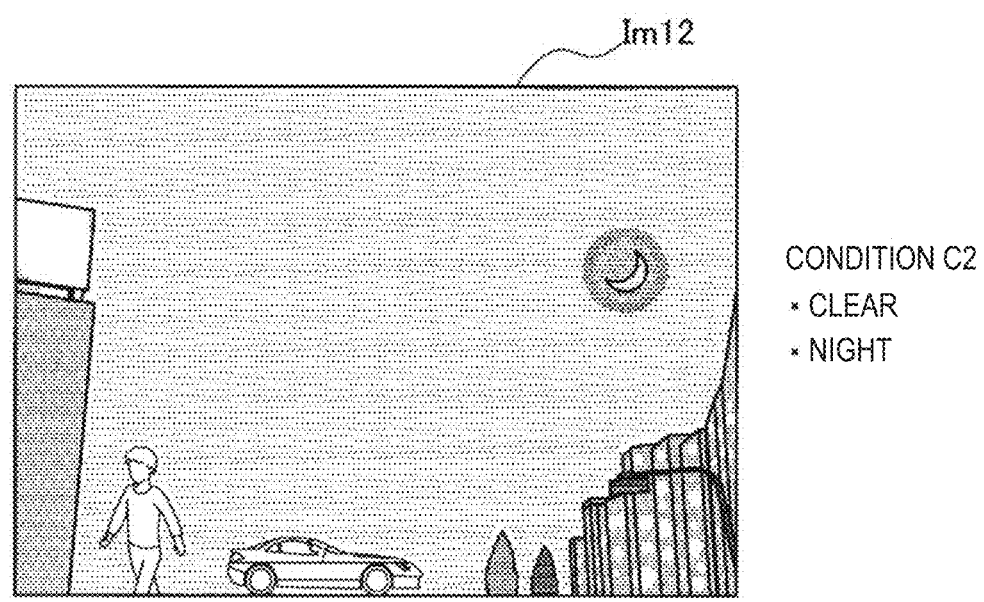
FIG. 9 is an explanatory diagram illustrating a second example of an imaging condition.
Figure 10:
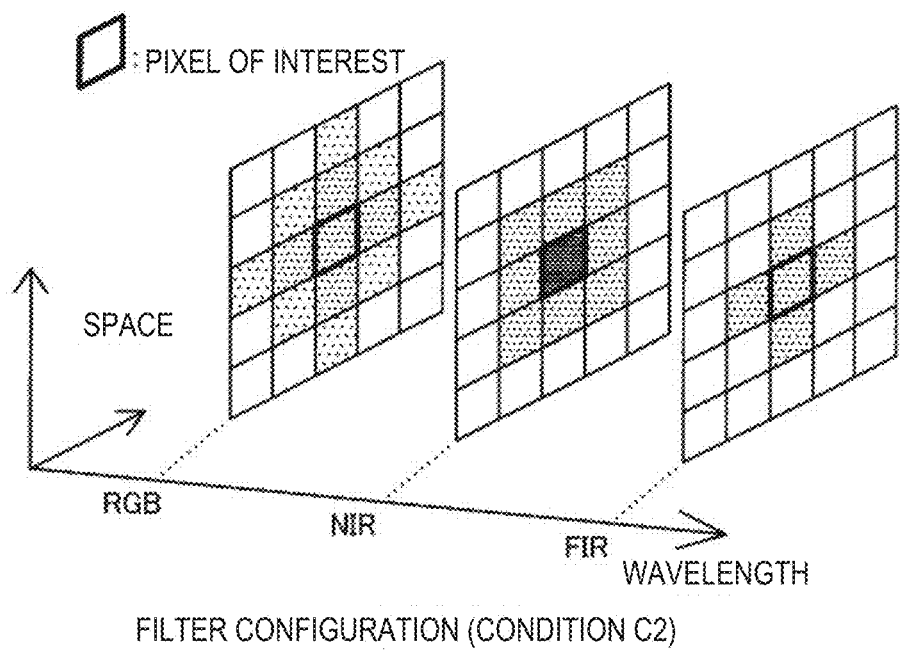
FIG. 10 is an explanatory diagram illustrating an example of a filter configuration corresponding to the second example of the imaging condition.

FIG. 9 is an explanatory diagram illustrating a second example of an imaging condition. Referring to FIG. 9, an illustrative visible light image Im12 is illustrated. The weather when the visible light image Im12 is captured is "clear," and the time slot is "night." That is, an imaging condition C2 associated with the visible light image Im12 represents a combination of "clear" and "night." FIG. 10 is an explanatory diagram illustrating an example of a filter configuration corresponding to the imaging condition C2. In the example of FIG. 10, pixels in a wider range from the visible light image are selected as filter taps in order to reduce an influence of noise that tends to appear in the visible light image captured at night, and in addition, more pixels are selected from the NIR image and the FIR image (as compared with the imaging condition C1). Also, the largest filter coefficient is provided for a pixel of interest in the NIR image.

Figure 11:
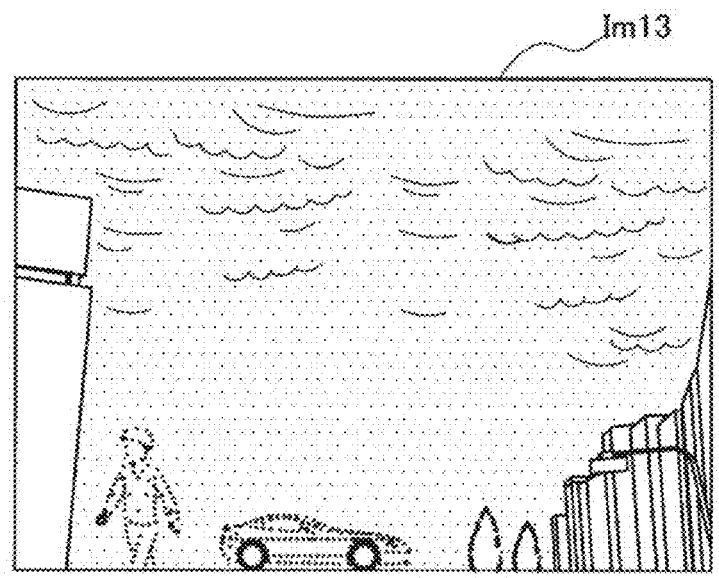
FIG. 11 is an explanatory diagram illustrating a third example of an imaging condition.
Figure 12:
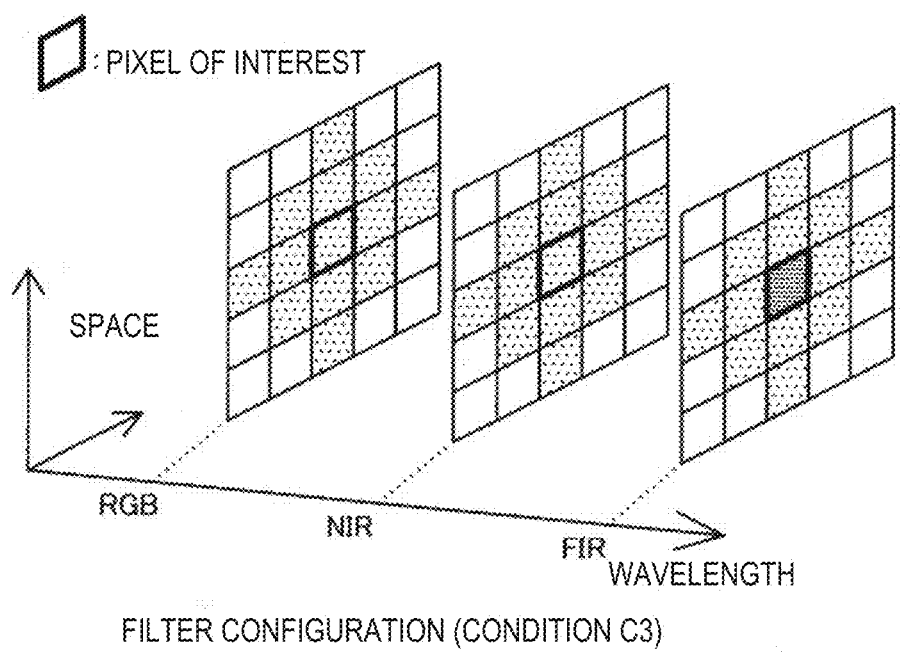
FIG. 12 is an explanatory diagram illustrating an example of a filter configuration corresponding to the third example of the imaging condition.

FIG. 11 is an explanatory diagram illustrating a third example of an imaging condition. Referring to FIG. 11, an illustrative visible light image Im13 is illustrated. The weather when the visible light image Im13 is captured is "foggy," and the time slot is "daytime." That is, an imaging condition C3 associated with the visible light image Im13 represents a combination of "foggy" and "daytime." FIG. 12 is an explanatory diagram illustrating an example of a filter configuration corresponding to the imaging condition C3. In the example of FIG. 12, pixels in a wider range from the respective images are selected as filter taps in consideration of an influence of light scattering, and a larger filter coefficient is provided for the pixel of interest in the FIR image in order to take advantage of far-infrared rays with high straightness.

The aforementioned filter configurations are only examples for explanation. The number and arrangement of filter taps for each image and a filter coefficient for each filter tap may be configured in any manner. For some of the imaging conditions, filter taps may not be selected from one or two of the FIR image, the NIR image, and the visible light image. In one example, the generation unit 160 can execute filtering with a filter configuration that is determined in advance through learning processing. In the learning processing performed in advance for determining a filter configuration, multiple combinations between sets of FIR images, NIR images, and visible light images in which a certain imaged object is captured (calibrated as needed) and color images (with sufficiently satisfactory image quality) obtained by capturing the same imaged object under a satisfactory imaging condition are prepared. These images correspond to student images and instructor images in learning with an instructor. A filter configuration for generating a color image with satisfactory image quality is determined from the sets of the FIR images, the NIR images, and the visible light images in accordance with an existing algorithm such as boosting or a support vector machine. It is possible to separately determine a filter configuration optimized for each imaging condition by separately performing such learning for each imaging condition candidate. For example, the database 170 stores filter configuration data indicating filter configurations for the respective imaging conditions that are learned in advance as described above.

The generation unit 160 acquires the filter configuration data corresponding to the imaging condition indicated by the imaging condition information input from the determination unit 140, for example, and sets filter taps and filter coefficients indicated by the acquired filter configuration data. Then, the generation unit 160 generates a color image by repeating the filtering with the set filter configuration while sequentially scanning the pixels of the images input from the image acquisition unit 120.

The generation unit 160 may display the generated color image on a screen of the display 110. The generation unit 160 may output the generated color image to an application in a later stage. The application in the later stage may be a drive assist application for an advanced driver assistance system (ADAS), for example. For example, the drive assist application can execute drive assist processing such as detection of a pedestrian, issuing of a collision alarm, and presentation of parking assist information on the basis of the color image generated by the generation unit 160.

In one modification example, the generation unit 160 may adjust the filter coefficients on the basis of a difference between the imaging condition determined by the determination unit 140 and the imaging condition obtained by the learning, and execute the aforementioned filtering by using the adjusted filter coefficients. In this modification example, the imaging condition is expressed by numerical values. For example, a time slot may be expressed by a numerical value in a predetermined range, the lower limit of which corresponds to the darkest night, and the upper limit of which corresponds to the brightest noon. Also, weather may be expressed by a numerical value such as the amount of clouds. Also, an integral numerical value based on a combination of a time slot, weather, and environmental illuminance may be calculated. In the learning processing performed in advance, an optimal filter configuration is determined for some representative (discrete) imaging condition values, and filter configuration data indicating the determined filter configuration is stored in the database 170. The generation unit 160 acquires filter configuration data that has been learned under a condition that is the closest to the imaging condition determined by the determination unit 140, adjusts a filter coefficient indicated by the acquired filter configuration data on the basis of a difference between the imaging conditions, and uses the adjusted filter coefficient for generating a color image. If the current time is later than the time at which the learning was performed and it is considered to be darker, the generation unit 160 may reduce weights of the pixels of the visible light image and instead raise weights of the pixels of the NIR image and the FIR image. It is possible to successively change the filter configuration for generating a color image in accordance with a successive change in imaging conditions by such adjustment. In this manner, it is possible to prevent provision of an unnatural color moving image in which the appearance of the color image suddenly and discontinuously changes to the user or the application in the later stage.

(5) Database

The database 170 stores a plurality of sets of the aforementioned filter configuration data indicating filter configurations determined in advance for the respective imaging condition candidates. Each set of the filter configuration data indicates pixel positions of filter taps to be selected from the FIR image, the NIR image, and the visible light image and filter coefficients to be applied to the respective filter taps. Imaging condition information for identifying a corresponding imaging condition is associated with each set of the filter configuration data.

[2-3. Flow of Processing]

(1) Color Image Generation Processing

FIG. 13 is a flowchart illustrating an example of a flow of color image generation processing according to the first embodiment. The color image generation processing illustrated in FIG. 13 is typically repeated for each of a series of frames that form a moving image.

First, the camera module 102 captures original images, in which an imaged object is captured, in the FIR region, the NIR region, and the visible light region (Step S100). Next, the image acquisition unit 120 performs preliminary processing such as calibration as needed on the original images captured by the camera module 102 and acquires an FIR image, an NIR image, and a visible light image (Step S105).

Then, the data acquisition unit 130 acquires auxiliary data to be utilized by the image processing device 100 to generate a color image (Step S110). The auxiliary data acquired here can include some of position measurement data, weather data, illuminance data, temperature data, and humidity data.

Next, the determination unit 140 determines an imaging condition when the images were captured by the camera module 102 using the auxiliary data input from the data acquisition unit 130, for example (Step S120). Then, the determination unit 140 outputs imaging condition information indicating the imaging condition determined to include one or more of a time slot, weather, and environmental illuminance to the generation unit 160.

Next, the generation unit 160 acquires filter configuration data corresponding to the imaging condition determined by the determination unit 140 from the database 170 and sets the filter configuration indicated by the acquired filter configuration data (Step S140). Then, the generation unit 160 generates a color image by filtering the FIR image, the NIR image, and the visible light image input from the image acquisition unit 120 with the set filter configuration (Step S150).

Next, if there is an application in a later stage (Step S160), the generation unit 160 outputs the generated color image to the application (for example, a drive assist application) (Step S165). Then, the generation unit 160 (or the application in the later stage) displays the color image on the screen of the display 110 (Step S170).

(2) Filter Configuration Setting Processing

Figure 14A:
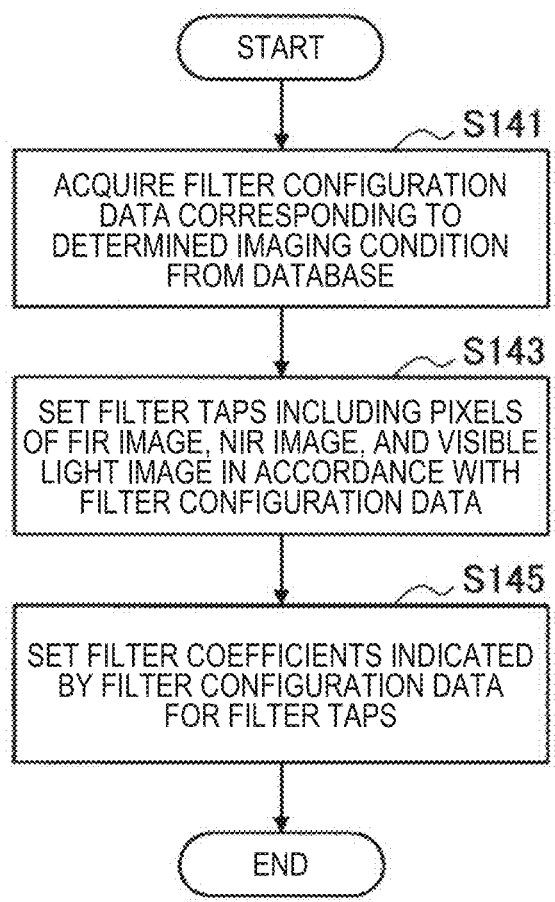
FIG. 14A is a flowchart illustrating a first example of a flow of filter configuration setting processing.

FIG. 14A is a flowchart illustrating a first example of a flow of filter configuration setting processing that can be executed in Step S140 in FIG. 13. Referring to FIG. 14A, the generation unit 160 first acquires filter configuration data corresponding to an imaging condition from the database 170 through lookup using the imaging condition indicated by imaging condition information (Step S141). Next, the generation unit 160 sets filter taps that can include pixels of the FIR image, the NIR image, and the visible light image in accordance with the acquired filter configuration data (Step S143). Also, the generation unit 160 sets filter coefficients indicated by the filter configuration data for the set filter taps (Step S145).

Figure 14B:
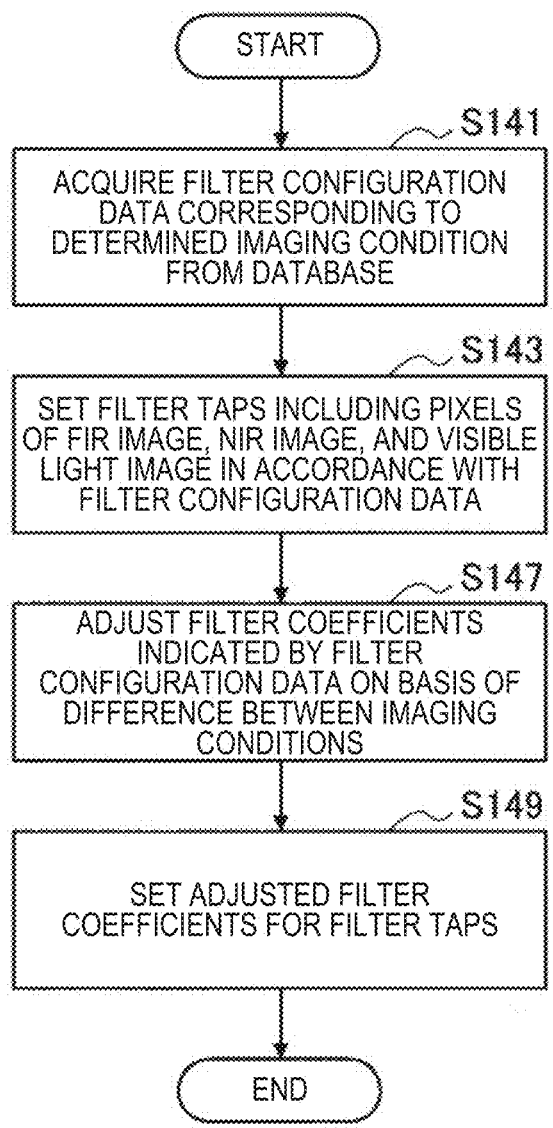
FIG. 14B is a flowchart illustrating a second example of a flow of filter configuration setting processing.

FIG. 14B is a flowchart illustrating a second example of a flow of the filter configuration setting processing that can be executed in Step S140 in FIG. 13. Referring to FIG. 14B, the generation unit 160 first acquires filter configuration data corresponding to the imaging condition determined by the determination unit 140 from the database 170 (Step S141). Next, the generation unit 160 sets filter taps that can include pixels of the FIR image, the NIR image, and the visible light image in accordance with the acquired filter configuration data (Step S143). Also, the generation unit 160 adjusts filter coefficients indicated by the filter configuration data on the basis of a difference between the imaging condition determined by the determination unit 140 and the imaging condition obtained by the learning (Step S147). Then, the generation unit 160 sets the adjusted filter coefficients for the filter taps set in Step S143 (Step S149).

3. SECOND EMBODIMENT

In the first embodiment described in the previous section, one filter configuration is used for generating one color image. In contrast, images are segmented into several partial regions, and optimal filter configurations are used for the respective partial regions in the second embodiment. It is possible to expect further improvement in image quality of a color image by switching or adaptively selecting filter configurations.

[3-1. Functional Configuration]

Figure 15:
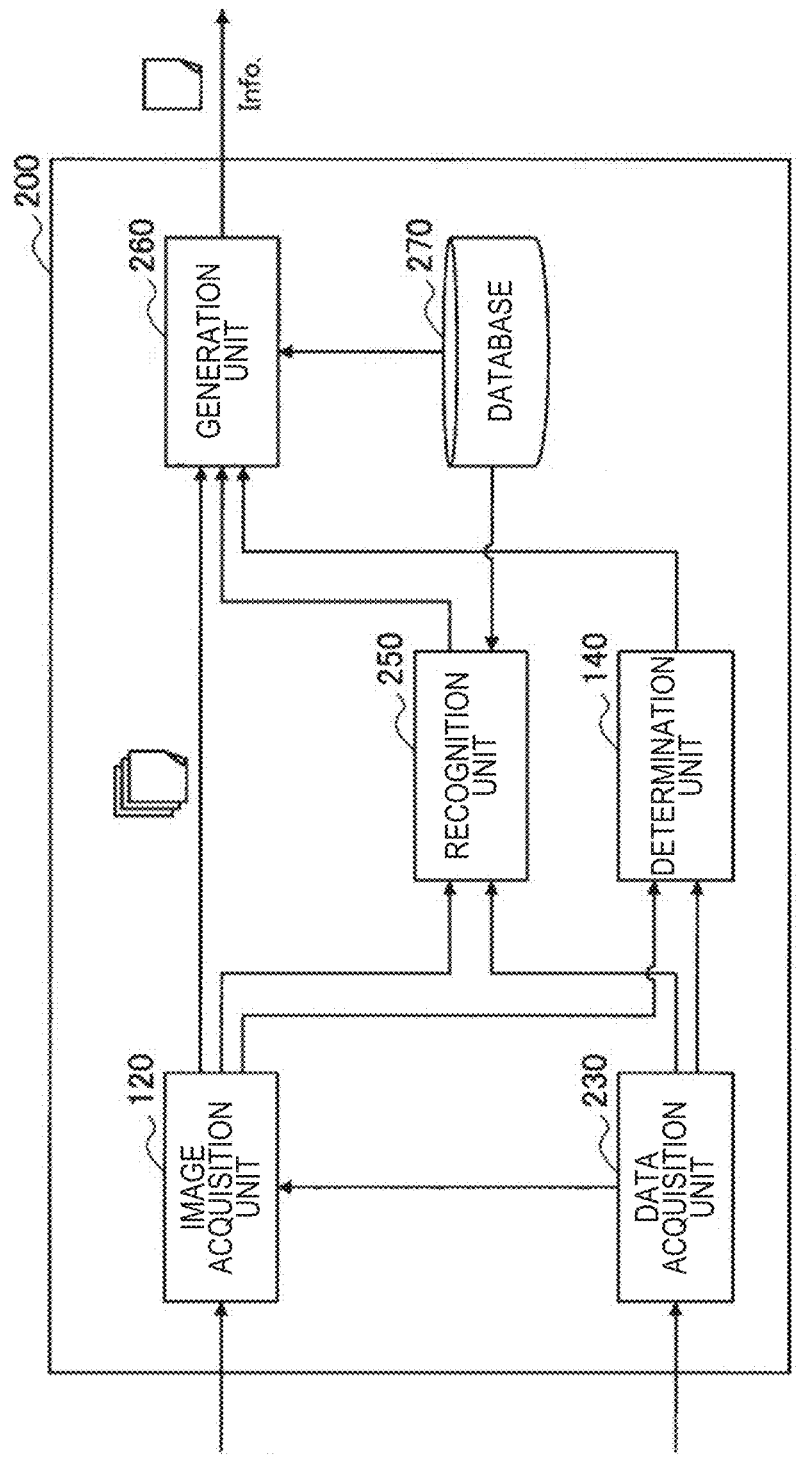
FIG. 15 is a block diagram illustrating an example of a configuration of theoretical functions of an image processing device according to a second embodiment.

A hardware configuration of an image processing device 200 according to the second embodiment may be the same as the hardware configuration of the image processing device 100 described above with reference to FIG. 3. FIG. 15 is a block diagram illustrating an example of a configuration of theoretical functions of the image processing device 200 according to the second embodiment. Referring to FIG. 15, the image processing device 200 includes the image acquisition unit 120, a data acquisition unit 230, the determination unit 140, a recognition unit 250, a generation unit 260, and a database 270.

(1) Data Acquisition Unit

The data acquisition unit 230 acquires auxiliary data to be utilized by the image processing device 200 to generate a color image. For example, the data acquisition unit 230 may acquire position measurement data from the sensor module 104 and acquire weather data from an external data server via the communication interface 112 (or input from the user) in the same manner as the data acquisition unit 130 according to the first embodiment. Also, the data acquisition unit 130 may acquire illuminance data, temperature data, and humidity data from the sensor module 104. The data acquisition unit 130 may acquire driving data from the vehicle network via the vehicle NW interface 113. In the embodiment, the data acquisition unit 230 may acquire depth data (also referred to as a depth map) indicating the distance to the imaged object, which has been measured by the depth sensor, for each pixel from the sensor module 104. The depth data can be utilized for segmenting images by the recognition unit 150 or setting of a filter configuration by the generation unit 160 as will be described later.

(2) Recognition Unit

The recognition unit 250 segments at least one of the FIR image, the NIR image, and the visible light image input from the image acquisition unit 120 into a plurality of partial regions. Then, the recognition unit 250 generates region information for specifying the segmented individual partial regions and outputs the generated region information to the generation unit 260. The region information described herein may be information indicating the position, the size, and the shape of each region or may be a bit map in which a bit value of pixels that belong to each region is represented as "1" and a bit value of other pixels is represented as "0." The region information may include information about a type (a living body region or an object region) or identification (such as a region ID) of each region.

For example, the recognition unit 250 recognizes a living body region in which a living body is captured in an image. The living body described herein may be only a human body or may include an animal body in addition to the human body. The recognition unit 250 may recognize a human body region in a visible light image or an NIR image using an arbitrary existing human body recognition technology (for example, a technology based on known image feature values of a human body). The recognition unit 250 may recognize a region that represents a relatively high grayscale value in an FIR image as a living body region. If one or more living body regions are recognized in an image, the recognition unit 250 generates living body region information for specifying each of the recognized living body regions. The recognition unit 250 may recognize an object region in which a predefined object is captured in an image using an arbitrary existing object recognition technology. The object described herein can include, for example, a vehicle, a transport signal, or a traffic sign. In this case, the recognition unit 250 generates object region information for specifying each object region recognized in the image. The recognition unit 250 may distinguish a certain living body or an object from another living body or an object (that appear to overlap, for example) in an image using depth data acquired by the data acquisition unit 230.

FIG. 16 is an explanatory diagram illustrating an example of region recognition processing executed by the recognition unit 250. A visible light image Im21 in one example is illustrated on the left side in FIG. 16. Two persons and one vehicle were captured in the visible light image Im21. A result of executing the region recognition processing on the visible light image Im21 by the recognition unit 250 is illustrated on the right side in FIG. 16. As a result of the region recognition processing, the visible light image Im21 is segmented into four regions R0, R11, R12, and R2. The regions R11 and R12 are living body regions, in each of which one person is captured. The region R2 is an object region in which the vehicle is captured, and corresponds to a non-living-body region. The region R0 is a non-living-body region in which no imaged object is captured.

(3) Generation Unit

The generation unit 260 generates a color image by filtering filter taps including pixels of the FIR image, the NIR image, and the visible light image. More specifically, the generation unit 260 executes filtering for generating a color image with a filter configuration that differs depending on an imaging condition determined by the determination unit 140 in the same manner as the generation unit 160 according to the first embodiment. Furthermore, the generation unit 260 changes the filter configuration for generating a color image depending on region information input from the recognition unit 250. In one example, the generation unit 260 may execute filtering on a living body region with a filter configuration that is different from a filter configuration used for a non-living-body region. Also, the generation unit 260 may execute filtering on a living body region with a filter configuration that further differs depending on a distance from the camera to the living body.

Figure 17A:
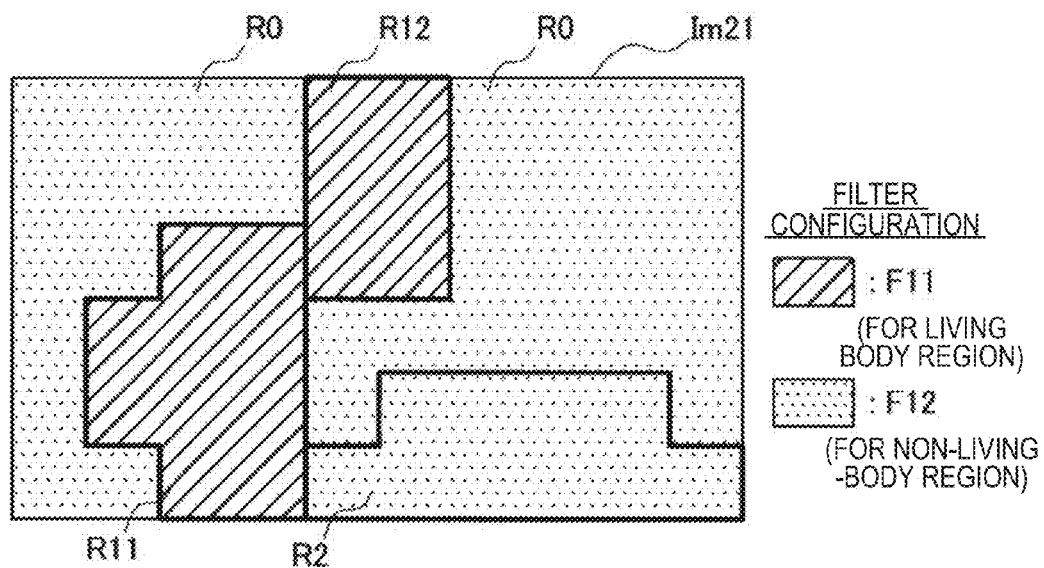
FIG. 17A is an explanatory diagram illustrating a first example of a filter configuration that can be set for each region on the basis of a result of the region recognition processing.
Figure 17B:
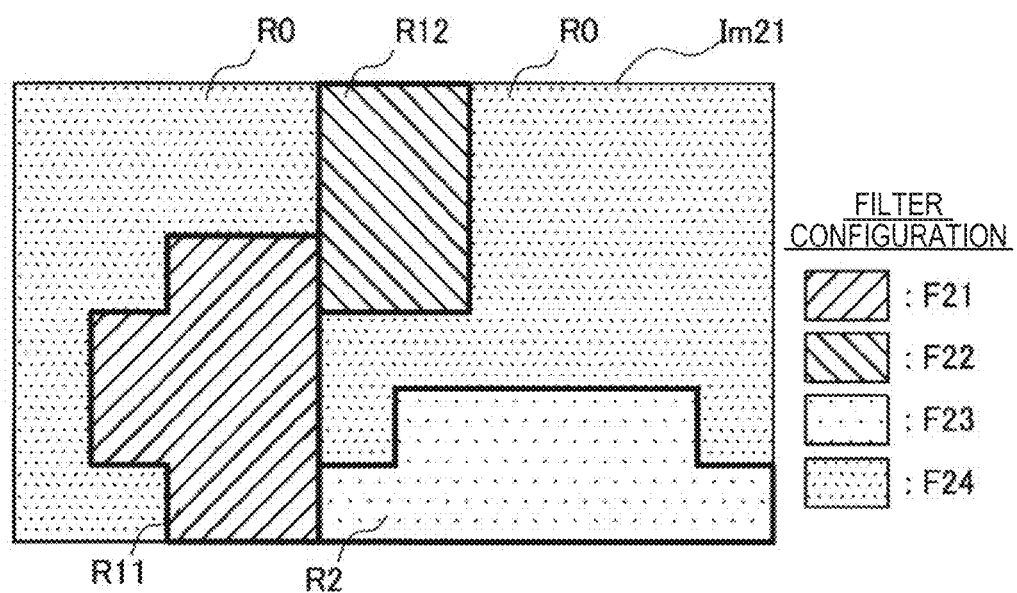
FIG. 17B is an explanatory diagram illustrating a second example of a filter configuration that can be set for each region on the basis of a result of the region recognition processing.

FIGS. 17A and 17B illustrate examples of filter configurations that can be set for each region by the generation unit 260 on the basis of the result of the region recognition processing illustrated in FIG. 16. In the first example illustrated in FIG. 17A, a filter configuration F11 for a living body region and a filter configuration F12 for a non-living-body region have been set as filter configurations corresponding to a certain imaging condition. The filter configuration 11 is applied to the regions R11 and R12. The filter configuration F12 is applied to the regions R0 and R1. The filter configuration F11 for a living body region has a filter coefficient for further enhancing identification of the living body as compared with the filter configuration F12 for a non-living-body region, for example. In the second example illustrated in FIG. 17B, a first filter configuration F21 for the living body region R11, a second filter configuration F22 for the living body region R12, a filter configuration F23 for the object region R2, and a fourth filter configuration F24 for the non-living-body region R0 have been set as filter configurations corresponding to a certain imaging condition. For example, the first filter configuration F21 for the living body region R11, in which it is estimated that a closer human body is captured on the basis of the depth data, may have a filter coefficient for further enhancing luminance or saturation as compared with the other filter configurations. These filter configurations become different configurations as the imaging condition changes. In this embodiment, optimal filter configuration can be determined in advance through learning processing for each combination between an imaging condition and a region type (or further, for each representative value of distance to the imaged object).

The generation unit 260 acquires filter configuration data corresponding to the combination of the region type and the imaging condition indicated by the imaging condition information from the database 270 for each region in accordance with the region information input from the recognition unit 250, for example. Then, the generation unit 260 generates a color image by repeating the filtering with the filter configuration indicated by the acquired filter configuration data while sequentially scanning pixels of the images input from the image acquisition unit 120.

The generation unit 260 may display the generated color image on the screen of the display 110. Also, the generation unit 260 may output the generated color image to an application in a later stage, such as a drive assist application. The generation unit 260 may output application assist information to the application in the later stage. The application assist information described herein can include one or more in the following list, for example.

a) Region information including at least one of living body region information and object region information b) Likelihood information calculated for each region in a)

c) Image feature values that can be calculated in association with living body recognition or object recognition d) Color probability distribution that can be calculated in association with generation of a color image For example, a grayscale value of each region in an FIR image captured at night has a strong correlation with likelihood that a living body is captured in the region. Thus, it is possible to contribute to an improvement in precision of processing, such as pedestrian detection in the drive assist application, by providing b) likelihood information generated by using an FIR image along with a) living body region information to the drive assist application. The aforementioned application assist information may be reused in order to avoid redundant generation (for example, re-segmentation of images or calculation of image feature values) of overlapping information in the application in the later stage.

(4) Database

The database 270 stores a plurality of sets of filter configuration data indicating filter configurations determined in advance for each combination of an imaging condition candidate and a region type. Imaging condition information for identifying a corresponding imaging condition and a region type are associated with each set of filter configuration data. A representative value of a distance from the camera to the imaged object may be further associated with each set of filter configuration data. The database 270 may store image feature value data (of a human body, a living body, or an object) that can be utilized by the recognition unit 250 in the region recognition processing.

[3-2. Flow of Processing]

Figure 18:
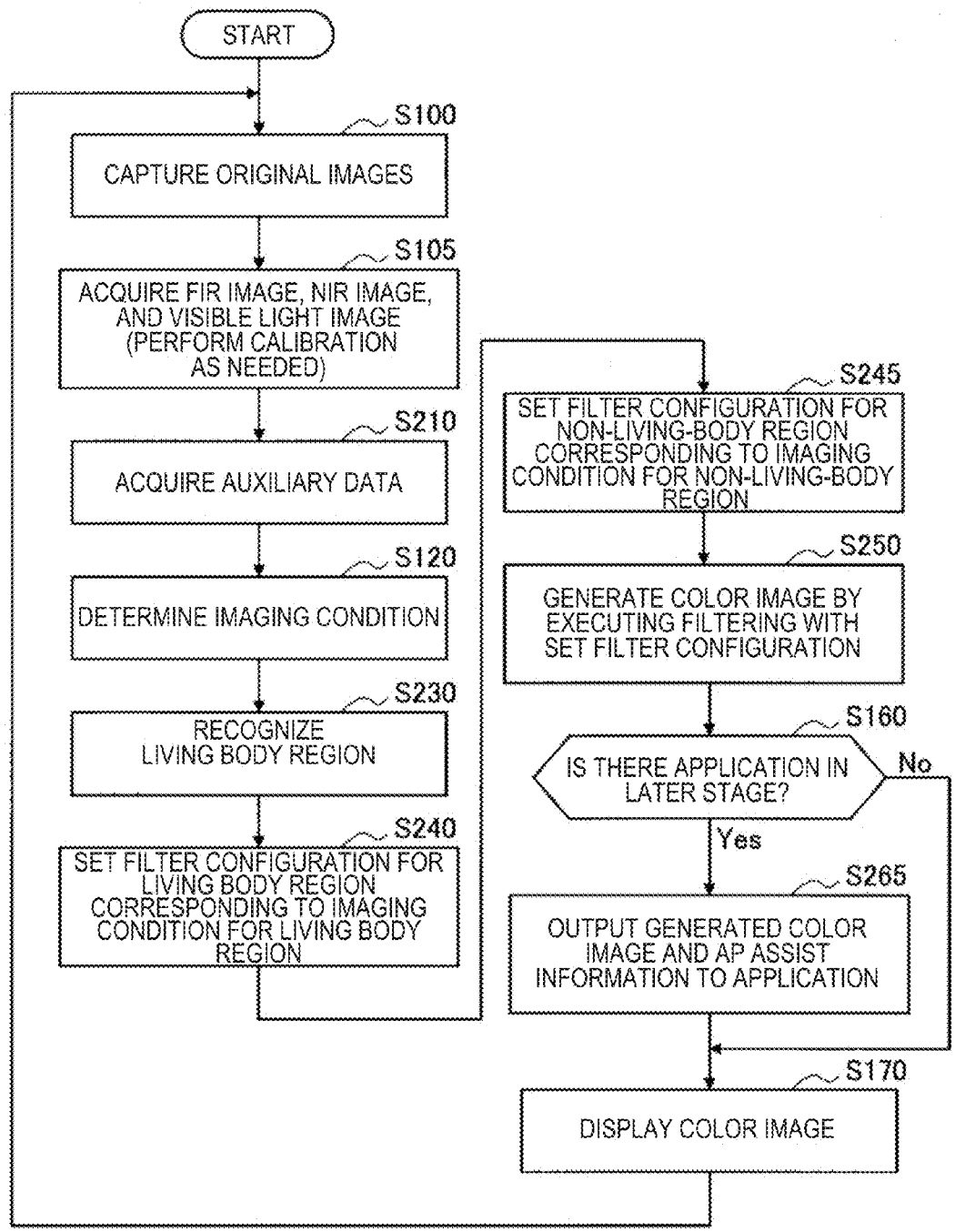
FIG. 18 is a flowchart illustrating an example of a flow of color image generation processing according to the second embodiment.

FIG. 18 is a flowchart illustrating an example of a flow of color image generation processing according to the second embodiment. The color image generation processing illustrated in FIG. 18 is typically repeated for each of a series of frames that form a moving image.

First, the camera module 102 captures original images, in which an imaged object is captured, in the FIR region, the NIR region, and the visible light region (Step S100). Next, the image acquisition unit 120 preforms preliminary processing such as calibration as needed on the original images captured by the camera module 102 and acquires an FIR image, an NIR image, and a visible light image (Step S105).

Next, the data acquisition unit 230 acquires auxiliary data that is utilized by the image processing device 200 to generate a color image (Step S210). The auxiliary data acquired here can include depth data in addition to data that is utilized for determining an imaging condition.

Next, the determination unit 140 determines an imaging condition when the images are captured by the camera module 102 using the auxiliary data input from the data acquisition unit 230, for example (Step S120). Then, the determination unit 140 outputs imaging condition information indicating the determined imaging condition to the generation unit 260.

Next, the recognition unit 250 recognizes a living body region in the images by detecting a living body which is captured in the images (Step S230). Next, the generation unit 260 acquires filter configuration data for a living body region corresponding to the determined imaging condition from the database 270 and sets a filter configuration indicated by the acquired filter configuration data for the living body region (Step S240). If no living body is captured in the images, Step S240 is omitted. The generation unit 260 acquires filter configuration for a non-living-body region corresponding to the determined imaging condition from the database 270 and sets a filter configuration indicated by the acquired filter configuration data for the non-living-body region (Step S245).

Then, the generation unit 260 generates a color image by filtering the FIR image, the NIR image, and the visible light image input from the image acquisition unit 120 with the set filter configuration (that differs for each region type) (Step S250).

Next, if there is an application in a later stage (Step S260), the generation unit 260 outputs the generated color image and application assist information to the application (for example, a drive assist application) (Step S265). Then, the generation unit 260 (or the application in the later stage) displays the color image on the screen of the display 110 (Step S170).

The example in which the filter configuration was able to be switched for each partial region of the images on the basis of the region type was mainly described. However, the present disclosure is not limited to the aforementioned example, and the filter configuration may be switched for each pixel, for example. Also, the switching of the filter configuration (both for each partial region and for each pixel) may be performed on the basis of other arbitrary information. For example, a filter configuration may be adaptively selected on the basis of a local image feature value such as edge intensity, a band, or activity of at least one of the FIR image, the NIR image, and the visible light image. An image feature value across different types of images, such as a correlation between the FIR image and the NIR image, may be utilized. Also, a combination of one or both of the aforementioned image condition and the region type and one or more of image feature values described herein may be utilized. Association between an image feature value and an optimal filter configuration may be determined through learning processing or may be modeled or tuned by developers.

4. APPLICATION EXAMPLES

Figure 19:
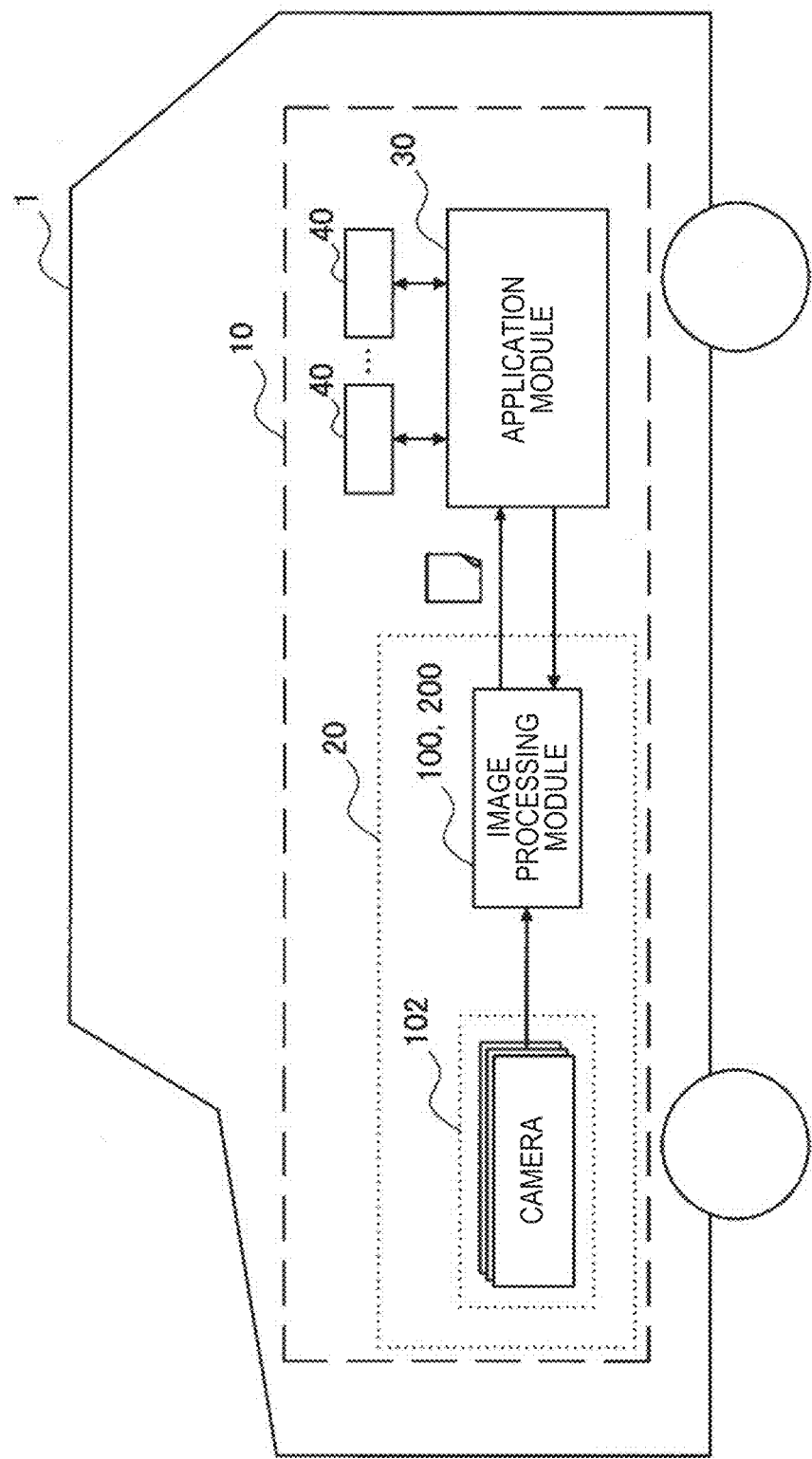
FIG. 19 is an explanatory diagram illustrating some application examples of the technology according to the present disclosure.

The technology according to the present disclosure can be applied to various products in different implementation levels. FIG. 19 is an explanatory diagram illustrating some application examples of the technology according to the present disclosure. A vehicle 1 in one example illustrated in FIG. 19 includes an in-vehicle system 10. The in-vehicle system 10 has an image processing system 20, an application module 30, and one or more peripheral modules 40. The image processing system 20 includes the camera module 102 and the image processing module 100 or 200 connected to the camera module 102. The image processing module 100 or 200 may be formed of a single chip (or a processor) or may be a group of a plurality of chips. The application module 30 is connected to the image processing system 20 via a contact terminal and a signal line. The application module 30 receives a color image generated by the image processing module 100 or 200 and executes an application on the basis of the received color image. The application module 30 can be implemented in the form of a CPU or a system-on-a-chip (SoC), for example. The peripheral module 40 includes a display, for example, and a color image processed by the application module 30 is displayed on the screen of the display.

5. CONCLUSION

The various embodiments of the technology according to the present disclosure were described above in detail with reference to FIGS. 1 to 19. According to the aforementioned embodiments, a color image is generated by acquiring a far-infrared image, a near-infrared image, and a visible light image in which a common imaged object is captured and filtering filter taps including pixels of the acquired far-infrared image, near-infrared image, and visible light image. With such a configuration, it is possible to effectively improve image quality of the generated color image by taking advantage of the respective characteristics of the far-infrared image, the near-infrared image, and the visible light image. For example, the far-infrared image provides information about which region in the image is to be expressed with more clarity and contributes to emphasis of colors in a living body region when a value is placed on visibility of a living body, in particular. The near-infrared image contributes to clarification of details of an imaged object under a situation of poor environmental light. The visible light image directly provides color information in the color image. It is possible to provide a color image with high image quality, which cannot be achieved by the existing technologies, by integrally taking advantage of the characteristics of the respective image types.

Further, according to the aforementioned embodiments, the filtering is executed with a filter configuration that differs depending on an imaging condition when the input images were captured. Therefore, it is possible to generate a color image with high image quality in a more robust manner by adaptively combining three types of images in accordance with changes in the imaging condition, such as temporal transition and a change in weather.

Further, according to the aforementioned embodiments, the filtering is executed by a filter configuration that is determined in advance through learning processing. Therefore, it is possible to stably generate a color image with high image quality without causing significant delay by quickly setting or adaptively changing the filter configuration even when value is placed on a real time property.

Further, according to a certain embodiment, a living body region in which a living body is captured is recognized in any of input images, and the filtering is executed on the living body region with a filter configuration that is different from a filter configuration used for a non-living-body region. Therefore, it is possible to display the living body in an emphasized manner in the color image and to improve reliability of recognizing the living body in processing in a later stage without burying the living body in the background.

Further, according to a certain embodiment, the filtering is executed on a region in which an imaged object is captured with a filter configuration that differs depending on a distance from the camera to the imaged object. Therefore, it is possible to particularly emphasize an object to which a driver is to pay attention, such as a nearby pedestrian or obstacle, in the color image for the purpose of drive assist, for example.

The series of control processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution by a computer, such programs are written into a random access memory (RAM) and executed by a processor such as a CPU.

Note that it is not necessary for the processes described in this specification with reference to the flowchart or sequence diagram to be executed in the order shown in the flowchart or sequence diagram. Some processing steps may be performed in parallel. Further, some of additional steps can be adopted, or some processing steps can be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing device including:

an image acquisition unit that acquires a far-infrared image, a near-infrared image, and a visible light image in which a common imaged object is captured; and a generation unit that generates a color image by filtering filter taps including pixels of the far-infrared image, the near-infrared image, and the visible light image.

(2)

The image processing device according to (1), further including:

a determination unit that determines an imaging condition when the far-infrared image, the near-infrared image, and the visible light image are captured, in which the generation unit executes the filtering with a filter configuration that differs depending on the imaging condition determined by the determination unit.

(3)

The image processing device according to (2), in which the generation unit executes the filtering with the filter configuration that is determined in advance through learning processing.

(4)

The image processing device according to (3), in which the generation unit executes the filtering by using a filter coefficient that is adjusted on the basis of a difference between the imaging condition determined by the determination unit and an imaging condition at the time of learning.

(5)

The image processing device according to any one of (2) to (4), in which the imaging condition includes one or more of a time slot, weather, and environmental illuminance.

(6)

The image processing device according to any one of (1) to (5), further including:

a recognition unit that recognizes a living body region, in which a living body is captured, in at least one of the far-infrared image, the near-infrared image, and the visible light image, in which the generation unit executes the filtering on the living body region with a filter configuration that is different from a filter configuration used for a non-living-body region.

(7)

The image processing device according to (6), in which the generation unit executes the filtering on the living body region with a filter configuration that differs depending on a distance from a camera to the living body.

(8)

The image processing device according to (6) or (7), in which the recognition unit generates living body region information that specifies the recognized living body region, and the generation unit outputs the living body region information along with the color image to an application in a later stage.

(9)

The image processing device according to any one of (1) to (7), in which the image processing device is installed in a vehicle, and the generation unit outputs the color image to a drive assist application.

(10)

An image processing method including:

acquiring a far-infrared image, a near-infrared image, and a visible light image in which a common imaged object is captured; and generating a color image by filtering filter taps including pixels of the far-infrared image, the near-infrared image, and the visible light image.

(11)

A program causing a computer that controls an image processing device to function as:

an image acquisition unit that acquires a far-infrared image, a near-infrared image, and a visible light image in which a common imaged object is captured; and a generation unit that generates a color image by filtering filter taps including pixels of the far-infrared image, the near-infrared image, and the visible light image.

(12)

An image processing system including:

a camera module that captures an imaged object in a far-infrared region, a near-infrared region, and a visible light region and outputs a corresponding far-infrared image, near-infrared image, and visible light image; and an image processing module that generates a color image by filtering filter taps including pixels of the far-infrared image, the near-infrared image, and the visible light image.

(13)

The image processing system according to (12), in which the image processing system is installed in a vehicle, and the image processing system further includes an application module that executes an application based on the color image that is generated by the image processing module.

REFERENCE SIGNS LIST 1 vehicle
10 in-vehicle system
20 image processing system
30 application module
40 peripheral module
100, 200 image processing device (image processing module)
102 camera module 110 display
120 image acquisition unit
130, 230 data acquisition unit
140 determination unit
250 recognition unit
160, 260 generation unit
170, 270 database

The invention claimed is:

1. An image processing device, comprising:
an image acquisition unit configured to acquire a far-infrared image, a near-infrared image, and a visible light image,
wherein each of the far-infrared image, the near-infrared image, and the visible light image corresponds to a common object; and
a generation unit configured to:
determine a first filter configuration that comprises an arrangement of filter taps,
wherein the filter taps correspond to pixels from each of the far-infrared image, the near-infrared image, and the visible light image; and
generate a color image based on filtration of each of the far-infrared image, the near-infrared image, and the visible light image,
wherein the filtration is based on the first filter configuration.

2. The image processing device according to claim 1, further comprising:
a determination unit configured to determine a first imaging condition of image capture of each of the far-infrared image, the near-infrared image, and the visible light image,
wherein the generation unit is further configured to determine the first filter configuration based on the first imaging condition.

3. The image processing device according to claim 2, further comprising a memory configured to store filter configuration data that corresponds to learning processing,
wherein the generation unit is further configured to determine the first filter configuration based on the filter configuration data.

4. The image processing device according to claim 3, wherein the generation unit is further configured to:
adjust a filter coefficient based on a difference between the first imaging condition and a second imaging condition that corresponds to the learning processing; and
execute the filtration based on the filter coefficient.

5. The image processing device according to claim 2, wherein the first imaging condition includes at least one of a time slot, a weather condition, or an environmental illuminance.

6. The image processing device according to claim 1, further comprising:
a recognition unit configured to recognize a living body region that corresponds to a living body, in at least one of the far-infrared image, the near-infrared image, or the visible light image,
wherein the generation unit is further configured to execute the filtration on the living body region with a second filter configuration, and
wherein the second filter configuration is different from a third filter configuration that corresponds to a non-living-body region.

7. The image processing device according to claim 6, wherein the second filter configuration is based on a distance from a camera to the living body.

8. The image processing device according to claim 6,
wherein the recognition unit is further configured to generate living body region information that specifies the recognized living body region, and
wherein the generation unit is further configured to output the living body region information and the color image to an application.

9. The image processing device according to claim 1,
wherein the image processing device is in a vehicle, and
wherein the generation unit is further configured to output the color image to a drive assist application.

10. An image processing method comprising:
acquiring a far-infrared image, a near-infrared image, and a visible light image,
wherein each of the far-infrared image, the near-infrared image, and the visible light image corresponds to a common object;
determining a filter configuration that comprises an arrangement of filter taps,
wherein the filter taps correspond to pixels from each of the far-infrared image, the near-infrared image, and the visible light image; and
generating a color image based on filtration of each of the far-infrared image, the near-infrared image, and the visible light image,
wherein the filtration is based on the filter configuration.

11. A non-transitory computer readable medium having stored thereon, computer-executable instructions which when executed by an image processing device, causes the image processing device to execute operations, the operations comprising:
acquiring a far-infrared image, a near-infrared image, and a visible light image,
wherein each of the far-infrared image, the near-infrared image, and the visible light image corresponds to a common object;
determining a filter configuration that comprises an arrangement of filter taps,
wherein the filter taps correspond to pixels from each of the far-infrared image, the near-infrared image, and the visible light image; and
generating a color image based on filtration of each of the far-infrared image, the near-infrared image, and the visible light image,
wherein the filtration is based on the filter configuration.

12. An image processing system, comprising:
a camera module configured to:
capture an object in a far-infrared region, a near-infrared region, and a visible light region; and
output a far-infrared image, near-infrared image, and visible light image; and
an image processing module configured to:
acquire the far-infrared image, the near-infrared image, and the visible light image;
determine a filter configuration that comprises an arrangement of filter taps,
wherein the filter taps correspond to pixels from each of the far-infrared image, the near-infrared image, and the visible light image; and
generate a color image based on filtration of each of the far-infrared image, the near-infrared image, and the visible light image,
wherein the filtration is based on the filter configuration.

13. The image processing system according to claim 12, wherein the image processing system is in a vehicle, and wherein the image processing system further includes an application module configured to execute an application based on the color image.

14. An image processing device, comprising:
an image acquisition unit configured to acquire a far-infrared image, a near-infrared image, and a visible light image,
   wherein each of the far-infrared image, the near-infrared image, and the visible light image corresponds to a common object;
a recognition unit configured to recognize a living body region, that comprises a living body, in at least one of the far-infrared image, the near-infrared image, or the visible light image; and
a generation unit configured to generate a color image based on filtration of each of the far-infrared image, the near-infrared image, and the visible light image,
   wherein the filtration is based on a second filter configuration, and
   wherein the second filter configuration is based on a distance from a camera to the living body.

* * * * *